United States Patent
Heurtefeux et al.

(10) Patent No.: US 10,797,854 B1
(45) Date of Patent: Oct. 6, 2020

(54) SYNCHRONIZATION SYSTEM FOR CONTROLLER AREA NETWORKS

(71) Applicant: Infineon Technologies AG, Neubiberg (DE)

(72) Inventors: Karel Heurtefeux, Munich (DE); Alexander Zeh, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/588,545

(22) Filed: Sep. 30, 2019

(51) Int. Cl.
*H04L 7/027* (2006.01)
*H04L 12/40* (2006.01)

(52) U.S. Cl.
CPC .............. *H04L 7/027* (2013.01); *H04L 12/40* (2013.01); *H04L 2012/40215* (2013.01)

(58) Field of Classification Search
CPC ..................... H04L 7/027; H04L 12/40; H04L 2012/40215
See application file for complete search history.

(56) References Cited

U.S. PATENT DOCUMENTS

| | | | | |
|---|---|---|---|---|
| 6,405,275 | B1* | 6/2002 | Morrow | G06F 13/426 370/487 |
| 9,094,286 | B2* | 7/2015 | Miyabe | H04L 45/48 |
| 2010/0098110 | A1* | 4/2010 | Mueller | H04J 3/0664 370/503 |
| 2011/0205433 | A1* | 8/2011 | Altmann | H04N 9/475 348/513 |
| 2012/0327918 | A1* | 12/2012 | Yi | H04W 4/029 370/337 |
| 2015/0063371 | A1* | 3/2015 | Horvath | H04L 47/826 370/461 |
| 2019/0342800 | A1* | 11/2019 | Sirotkin | H04B 17/318 |

* cited by examiner

*Primary Examiner* — Freshteh N Aghdam
(74) *Attorney, Agent, or Firm* — Harrity & Harrity, LLP

(57) ABSTRACT

A receiver device may include a receiver and one or more processors. The receiver device may be configured to receive a first set of frames from a first device indicating a transmit time of the first set of frames, and a second set of frames from a second device indicating a transmit time of the second set of frames and an arrival time of the first set of frames. The receiver device may be configured to determine a first transmission delay based on the transmit and arrival times of the first set of frames, and determine a second transmission delay based on the transmit and arrival times of the second set of frames. The receiver device may be configured to transmit a third set of frames indicating the arrival times of the first and second sets of frames, and a transmit time of the third set of frames.

20 Claims, 16 Drawing Sheets

SYNCHRONIZATION SYSTEM FOR CONTROLLER AREA NETWORKS

BACKGROUND

A Controller Area Network (CAN) is a network of one or more communication buses that interconnect nodes of a particular system. An individual node can include a sensor, an actuator, a controller, and/or another device that is used by the system to perform a function. In a vehicle system, a node can correspond to a sensor, an actuator, and/or an Electronic Control Unit (ECU) (e.g., an Engine Control Module (ECM), a Powertrain Control Module (PCM), a Transmission Control Module (TCM), a Brake Control Module (BCM), a Central Control Module (CCM), a Central Timing Module (CTM), a General Electronic Module (GEM), a Body Control Module (BCM), a Suspension Control Module (SCM), and/or the like) that is associated with a function of a vehicle. Nodes within a CAN communicate with one another via the CAN bus using string of bits, or frames, that are serially transmitted and/or received according to a message-based communication protocol. Although a CAN bus is often used in vehicles (e.g., road vehicles, off-road vehicles, marine vehicles, aerial vehicles, and/or the like), a CAN bus can also be used for other applications (e.g., industrial systems, medical systems, robotics systems, and/or the like).

SUMMARY

According to some implementations, a receiver device may include a receiver and one or more processors configured to receive, from a first device, a first set of frames via a communication bus, wherein the first set of frames indicates a transmit time of the first set of frames; receive, from a second device, a second set of frames via the communication bus, wherein the second set of frames indicates a transmit time of the second set of frames and an arrival time of the first set of frames relative to the second device; determine a first transmission delay associated with the first device based on the transmit time of the first set of frames and an arrival time of the first set of frames relative to the receiver device; determine a second transmission delay associated with the second device based on the transmit time of the second set of frames and an arrival time of the second set of frames relative to the receiver device; and transmit, after receiving the first set of frames and the second set of frames, a third set of frames, wherein the third set of frames indicates the arrival time of the first set of frames, the arrival time of the second set of frames, and a transmit time of the third set of frames.

According to some implementations, a method may include receiving, by a first device, a first set of frames from a second device via a CAN bus, wherein the first set of frames indicates a transmit time of the first set of frames; receiving, by the first device and after receiving the first set of frames, a second set of frames from a third device via the CAN bus, wherein the second set of frames indicates a transmit time of the second set of frames and an arrival time of the first set of frames relative to the third device; determining, by the first device, a first transmission delay associated with the second device based on the transmit time of the first set of frames and an arrival time of the first set of frames relative to the first device; determining, by the first device, a second transmission delay associated with the third device based on the transmit time of the second set of frames and an arrival time of the second set of frames relative to the first device; and transmitting, by the first device and after receiving the first set of frames and the second set of frames, a third set of frames, wherein the third set of frames indicates the arrival time of the first set of frames, the arrival time of the second set of frames, and a transmit time of the third set of frames.

According to some implementations, a sender device may include a transmitter and one or more processors configured to transmit a first set of frames via a communication bus, wherein the first set of frames indicates a transmit time of the first set of frames; receive, from a first device and after transmitting the first set of frames, a second set of frames, wherein the second set of frames indicates an arrival time of the first set of frames relative to the first device, an arrival time of a third set of frames relative to the first device, and a transmit time of the second set of frames; identify the arrival time of the first set of frames and the transmit time of the second set of frames based on the second set of frames; and determine a transmission delay associated with the first device based on the arrival time of the first set of frames and the transmit time of the second set of frames.

DETAILED DESCRIPTION

Figure 1:
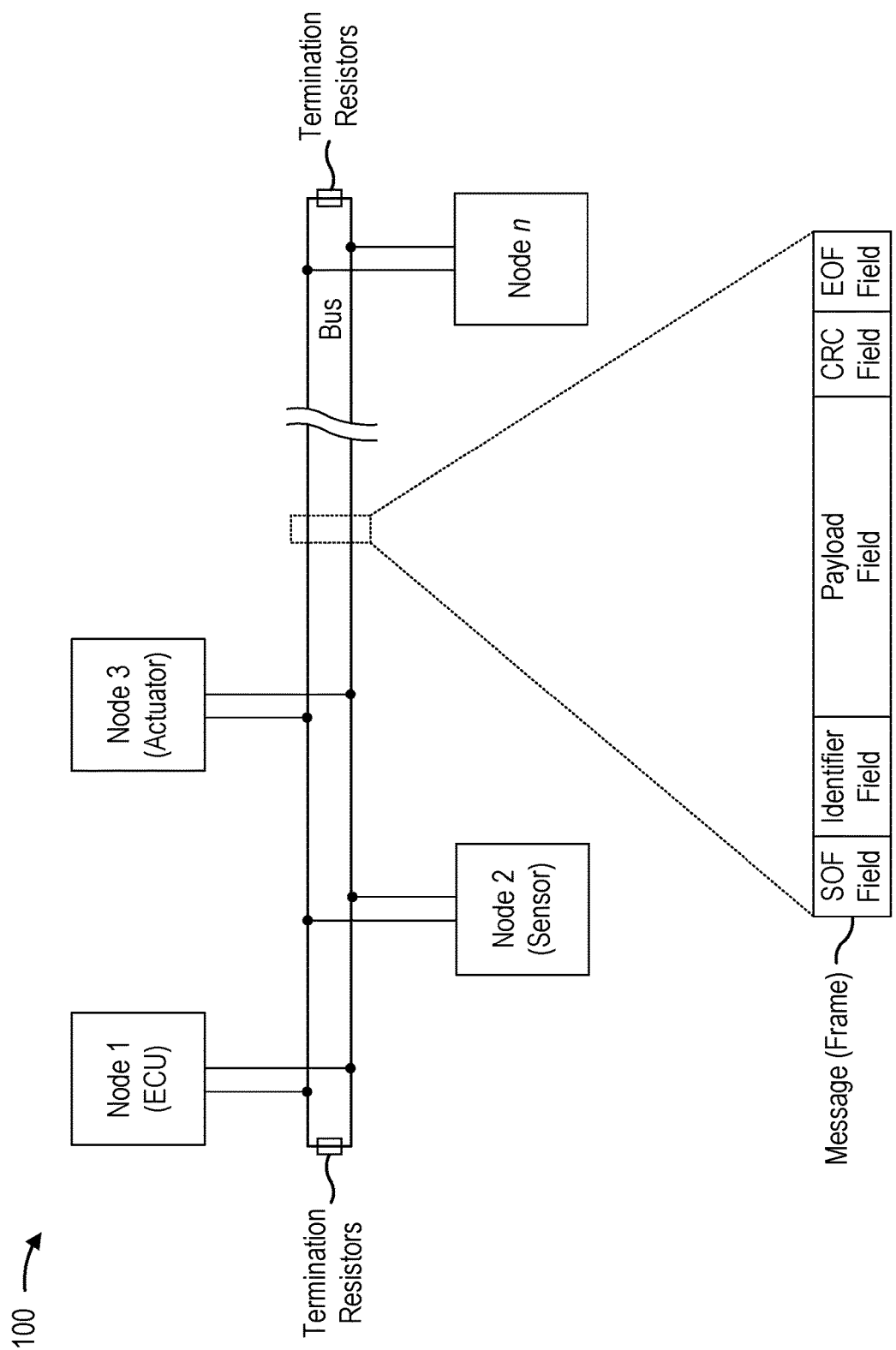
FIG. 1 is a diagram of an example environment in which systems and/or methods, described herein, may be implemented.

The following detailed description of example implementations refers to the accompanying drawings. The same reference numbers in different drawings may identify the same or similar elements.

As described above, a CAN may include a network of one or more communication buses that interconnect nodes of a system (e.g., a vehicle system, an industrial system, a medical system, a robotics system, and/or the like). A node may include a sensor, an actuator, a controller, and/or another device that is used to perform a function of the associated system. In a vehicle, for instance, a node may correspond to a sensor, an actuator, and/or an ECU that is associated with a throttle function, a steering function, a braking function, a gear selection function, and/or another function of the vehicle. A node may communicate with other nodes on a CAN bus via frames (e.g., strings of bits) that are serially transmitted and/or received according to a message-based communication protocol. For example, a node may transmit a frame of dominant and/or recessive bits that can be interpreted by another node as information provided via a sensor, information for controlling an actuator, an operating parameter, an operating condition, and/or the like.

According to the communication protocol, a frame having higher priority (e.g., with dominant leading bits) may be transmitted before a frame having lower priority (e.g., with recessive leading bits). Nodes of a CAN bus may be provided in a multi-master arrangement in which information that is transmitted via the CAN bus is available to any connected node seeking the information.

Increasingly more systems (e.g., vehicle systems) rely on electrical controls rather than mechanical controls in order to operate. This leads to an increased reliance on CAN buses to support a growing volume of information that is exchanged between nodes and an increased need to maintain accurate timing of the messages. In some cases, a change in temperature and/or another environmental factor may cause an offset in clock synchronization (e.g., a change in a transmission delay) between nodes. An offset in clock synchronization may result in a misinterpretation of a message, an omission of an important message, an unwanted delay, and/or another event that can disrupt an operation of an associated system. In some cases, such as in vehicle systems, an offset in clock synchronization may disrupt potentially time-sensitive and critical functions (e.g., information relating to throttle functions, steering functions, braking functions, gear selection functions, and/or the like), which may further lead to potential safety concerns. In order to maintain accurate timing of message, nodes of a CAN bus may perform a clock synchronization procedure periodically and/or intermittently (e.g., upon startup of an associated system, per drive cycle in a vehicle system, and/or as otherwise defined at manufacture time) to account for a change in transmission delay. Because a CAN bus arranged in a multi-master arrangement typically does not provide a centralized clock reference, nodes within a CAN bus may synchronize with one another by exchanging timestamped messages to perform one-way, two-way, and/or four-way clock synchronization.

In one-way clock synchronization, a sender node may transmit a message (e.g., with a timestamp of a transmit time of the message) to a receiver node. The receiver node may determine an arrival time of the message, determine a transmission delay of the message (e.g., based on the transmit and arrival times of the message), and synchronize an internal clock of the receiver node based on the transmission delay associated with the sender node. In a two-way clock synchronization procedure, the receiver node may further transmit a response message (e.g., with timestamps of the arrival time of the original message and a transmit time of the response message) to the sender node. The sender node may similarly determine a transmission delay (e.g., based on the transmit and arrival times of the original message, and the transmit and arrival times of the response message), and synchronize an internal clock of the sender node based on the transmission delay associated with the receiver node. In some cases, one-way and two-way clock synchronization may involve a process that additionally authenticates a timestamped message. However, the process of authenticating a timestamped message may introduce an unknown delay in the transmission delay that can offset clock synchronization. Furthermore, the delay may be inconsistent, unpredictable, and difficult to account for. In such cases, four-way clock synchronization may be used for better accuracy.

In four-way clock synchronization, a sender node and a receiver node generally follow two-way clock synchronization, but transmit a timestamp of a timestamped message in a separate supplemental message that is different from the timestamped message. For instance, the sender node may transmit a first message (e.g., without a timestamp) and locally store a timestamp of a transmit time of the first message. The receiver node may determine and locally store an arrival time of the first message. The sender node may transmit a second message (e.g., with the timestamp of the transmit time of the first message) to the receiver node. The receiver node may determine a transmission delay (e.g., based on the transmit and arrival times of the first message), and synchronize an internal clock of the receiver node based on the transmission delay. Similarly, the receiver node may further transmit a first response message (e.g., without a timestamp) and locally store a timestamp of a transmit time of the first response message. The sender node may determine and locally store an arrival time of the first response message. The receiver node may transmit a second response message (e.g., with timestamps of the arrival time of the first message and the transmit time of the first response message) to the sender node. The sender node may determine a transmission delay (e.g., based on the transmit and arrival times of the first message and the transmit and arrival times of the first response message), and synchronize an internal clock of the sender node based on the transmission delay.

Although one-way, two-way, and/or four-way clock synchronization may enable authenticated and accurate synchronization, such procedures rely on a significant number of messages to be exchanged per synchronization. For instance, two-way clock synchronization requires two messages to be exchanged for each distinct pair of nodes of a CAN bus. In a CAN bus with n nodes, a synchronization session may result in n(n−1) exchanged messages. A system that includes 20 nodes on a particular CAN bus may thus require 380 messages to be exchanged in order to complete synchronization. Four-way clock synchronization requires four messages to be exchanged for each distinct pair of nodes of a CAN bus. In a CAN bus with n nodes, a synchronization session may result in 2n(n−1) exchanged messages. A system with 20 nodes may thus require 760 messages to be exchanged in order to complete synchronization. Because a CAN bus is limited to serial communication, each of the messages may need to be separately exchanged. This can correspond to a significant amount of time, during which the CAN bus may be unusable for other important operations of an associated system. Furthermore, using more messages may introduce more potential for error and consume more resources (e.g., processor resources, memory resources, transceiver resources, bus resources, and/or the like) that may otherwise be used for other operations.

Some implementations described herein provide a synchronization system that enables authenticated clock synchronization in an accurate and efficient manner. For example, in relation to two-way clock synchronization, the synchronization system may enable a single node to transmit a single synchronization message to multiple nodes, and/or enable the multiple nodes to receive the single synchronization message from the single node. The synchronization system may similarly enable a node that received the synchronization message to transmit a single response message to multiple nodes, and/or enable the multiple nodes to receive the single response message from the node. In relation to a four-way clock synchronization procedure, the synchronization system may enable a single node to transmit a single set of synchronization messages to multiple nodes, and/or enable the multiple nodes to receive the single set of synchronization messages from the single node. The synchronization system may similarly enable a node that received the set of synchronization messages to transmit a single set of response messages to multiple nodes, and/or enable the multiple nodes to receive the single set of response messages from the node. The response messages and/or the sets of response messages may be transmitted according to respective priorities of the messages (e.g., determined based on respective identifiers of the nodes, a clock synchronization schedule defined at manufacture time, and/or the like).

In this way, the synchronization system may significantly reduce a number of messages that are exchanged in order to perform clock synchronization within a CAN bus without compromising authentication and without adversely affecting accuracy. For example, in a CAN bus with n nodes, the synchronization system may enable two-way clock synchronization with n messages rather than $n(n-1)$ messages as with current two-way synchronization procedures. Similarly, in a CAN bus with n nodes, the synchronization system may enable four-way clock synchronization with $2n$ messages rather than $2n(n-1)$ messages as with current four-way synchronization procedures. By using fewer messages, the synchronization system completes clock synchronization in a shorter period of time and spends significantly less time on the CAN bus. The synchronization system thereby enables the CAN bus to be used for other important operations of an associated system. Also, by using fewer messages, the synchronization system reduces a susceptibility to error that may result from exchanging excess messages. Furthermore, by using fewer messages and spending less time on the CAN bus, the synchronization system conserves resources (e.g., processor resources, memory resources, transceiver resources, bus resources, and/or the like) that may otherwise be used to perform clock synchronization.

FIG. 1 is a diagram of an example environment 100 in which systems and/or methods, described herein, may be implemented. As shown in FIG. 1, environment 100 may correspond to a CAN having a node, a communication bus (e.g., a CAN bus), and a termination resistor. A node (e.g. Node 1, Node 2, Node 3, or Node n) may include a sensor, an actuator, and/or a controller of an associated system that is configured to perform a function of the associated system. In a vehicle system, for example, a node may correspond to a sensor, an actuator, and/or an ECU associated with a throttle function, a steering function, a braking function, a gear selection function, and/or another function for operating a vehicle. As shown for the example in FIG. 1, the communication bus may include two bus terminals (e.g., a high bus terminal and a low bus terminal). A node may selectively apply a direct current (DC) voltage signal across the bus terminals to transmit a dominant bit or a recessive bit. For example, a node may transmit a dominant bit (e.g., a logical "0" bit) by driving the high bus terminal to a high voltage (e.g., 5 VDC) and by driving the low bus terminal to a low voltage (e.g., 0 VDC), and transmit a recessive bit (e.g., a logical "1" bit) by driving neither bus terminal. The bus terminals may extend between the nodes and enable information (e.g., information provided via a sensor, information for controlling an actuator, an operating parameter, an operating condition, and/or the like) to be exchanged between the nodes. A termination resistor may include an electrical resistor configured to limit a signal reflection between nodes.

In some implementations, the communication bus may correspond to a communication bus of another type of network (e.g., a Controller Area Network with Flexible Data Rate (CAN FD), a Controller Area Network Extra Large (CAN XL), a Local Interconnect Network (LIN), a FlexRay network, an Ethernet network, and/or the like). Although shown with two bus terminals, the communication bus may interconnect the nodes using a different number of bus terminals and/or using a different arrangement of bus terminals that interconnect a different arrangement of nodes. In some examples, the communication bus may be provided in a multi-master arrangement in which information transmitted via the communication bus is available to any node that is connected to the communication bus. In some examples, the communication bus may be arranged in a form of a ring topology (e.g., in which ends of the communication bus are electrically coupled to a single master unit). Additionally, or alternatively, the communication bus may be comprised of a plurality of communication buses and/or in selective communication with one or more additional communication buses. Although a CAN bus is often used in vehicles (e.g., road vehicles, off-road vehicles, marine vehicles, aerial vehicles, and/or the like), a CAN bus may also be used in other applications (e.g., industrial systems, medical systems, robotics systems, and/or the like).

In some implementations, the nodes of a communication bus may communicate with one another according to a message-based communication protocol. For example, a sender node may transmit a message as a frame of bits that are serially introduced into the communication bus and serially received by a receiver node of the communication bus. A frame may generally include one or more designated fields that provide different types of information relating to the message contained in the frame. As shown for the example in FIG. 1, a frame may include a start-of-frame (SOF) field, an identifier field, a payload field, a cyclic redundancy check (CRC) field, an end-of-frame (EOF) field, and/or the like. The SOF field may include one or more bits designating a start of a new message. The identifier field may include one or more bits identifying a priority of the frame, a type of content contained in the frame, a unique identifier of a sender node, a unique identifier of a receiver node, and/or other information that can be used by a receiver node to identify an intended recipient of the message. The payload field may include one or more bits relating to underlying content of the message. The CRC field may include one or more bits configured to enable a receiver node to determine consistency between a received message and a transmitted message. The EOF field may include one or more bits designating an end of the message. In some examples, a frame may include additional fields, fewer fields, and/or a different arrangement of fields than shown.

In some implementations, the nodes of the communication bus may perform clock synchronization to ensure messages are transmitted and/or received in a timely and accurate manner. For example, because the communication bus may not provide a centralized clock reference, the individual nodes within the communication bus may synchronize with one another by exchanging authenticated messages with timestamp information (e.g., information relating to a transmit time of a message, an arrival time of a message, and/or the like). The nodes may be configured to perform clock synchronization according to a two-way synchronization procedure and/or a four-way synchronization procedure, as described below. In some examples, the nodes may be configured to perform a one-way clock synchronization procedure as part of the two-way synchronization procedure and/or the four-way synchronization procedure, as described below. The nodes may be configured to perform clock synchronization periodically, intermittently, and/or as otherwise defined (e.g., at a time of manufacture). In some examples, such as in a vehicle, the nodes may be configured to perform clock synchronization upon startup of an engine of the vehicle, upon initialization of a new drive cycle, and/or as otherwise defined by a manufacturer of the vehicle.

The number and arrangement of devices and networks shown in FIG. 1 are provided as one or more examples. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2A:
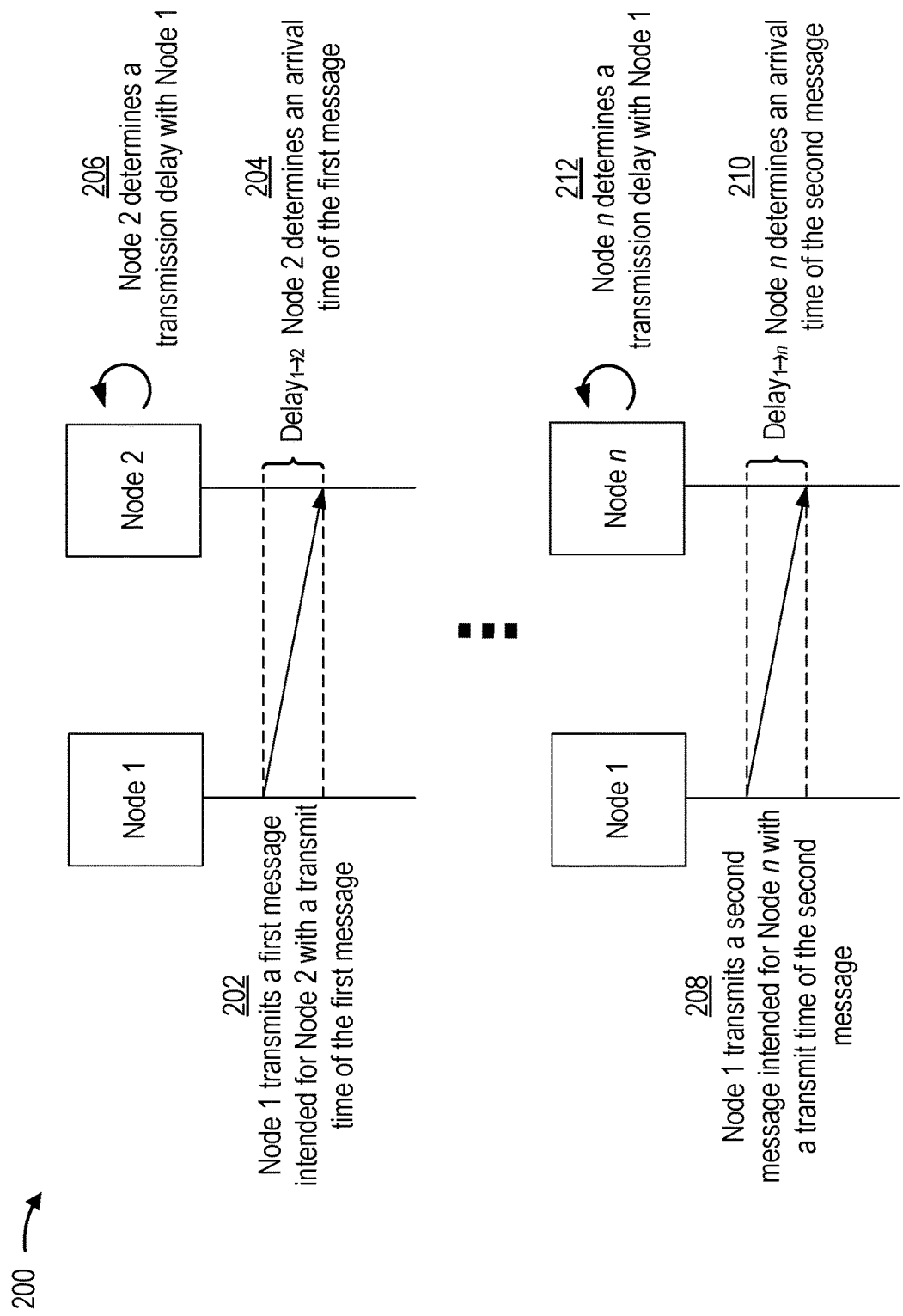
FIGS. 2A-2B are diagrams of an implementation of a synchronization system.
Figure 2B:
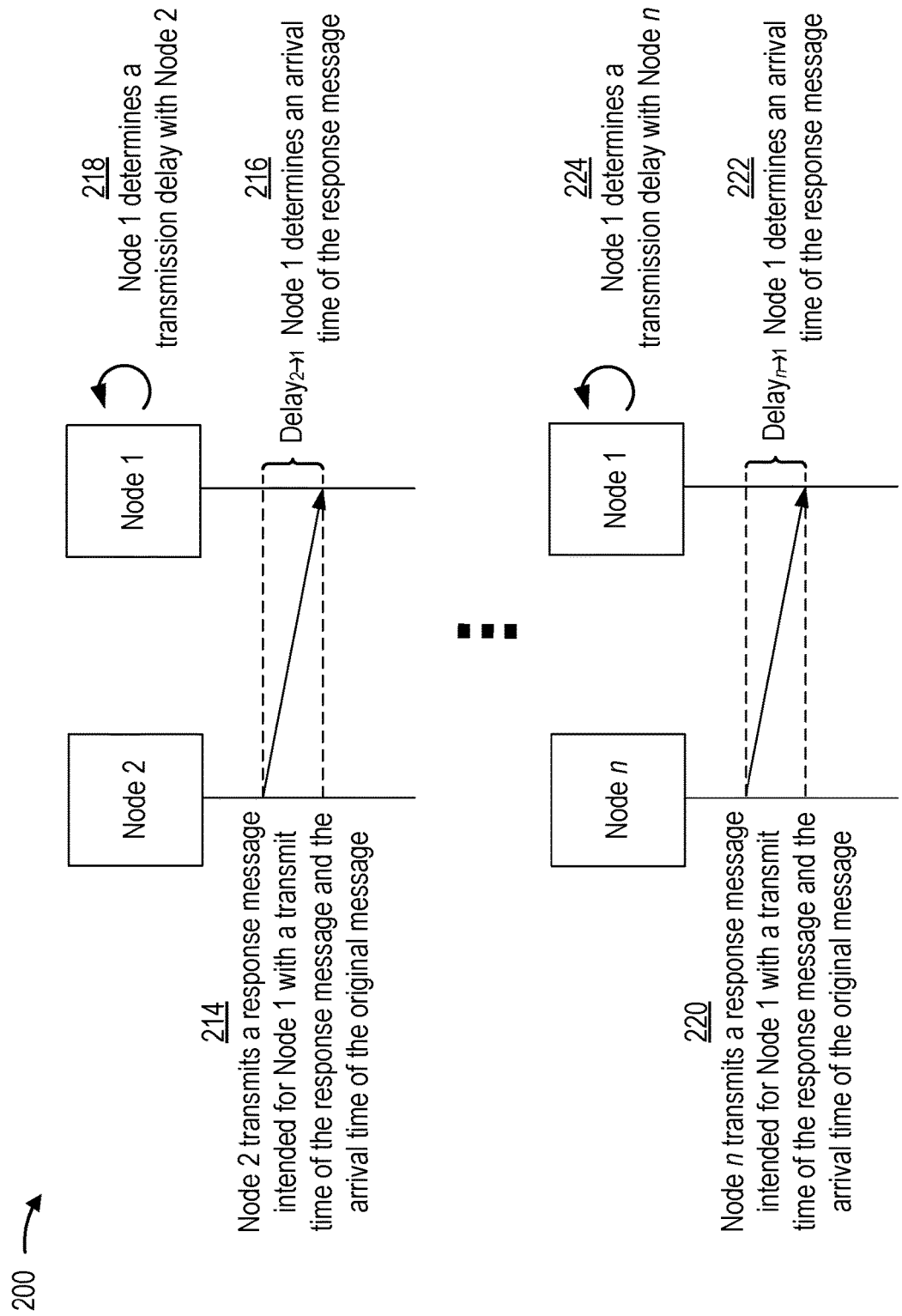

FIGS. 2A-2B are diagrams of an implementation 200 of a synchronization system. As shown in FIGS. 2A-2B, implementation 200 includes a first node (e.g., Node 1), a second node (e.g., Node 2), and a third node (e.g., Node n) that are interconnected via a communication bus (e.g., a CAN bus). FIGS. 2A-2B present one or more functions performed by the first node, the second node, and/or the third node to perform clock synchronization (e.g., via one-way synchronization and/or two-way synchronization).

As shown in FIG. 2A, and by reference number 202, the first node transmits a first message (e.g., a frame of bits corresponding to the message) to the second node for performing clock synchronization via the communication bus. The first message is specifically intended for the second node. For example, a frame of the first message includes an identifier field with information (e.g., one or more unique identifiers) identifying the first node as a sender of the first message and/or the second node as an intended recipient of the first message. The frame includes a payload field with information (e.g., a timestamp) indicating a transmit time of the first message. The frame indicates information that enables the second node to determine a transmission delay (e.g., $Delay_{1 \to 2}$) with the first node.

As further shown in FIG. 2A, and by reference number 204, the second node determines an arrival time of the first message transmitted by the first node. For example, the second node receives the first message transmitted by the first node, determines the arrival time of the first message, and locally stores the arrival time of the first message (e.g., in a local storage device of the second node). The second node identifies the first node as a sender of the first message based on a unique identifier and/or other information indicated by an identifier field of the corresponding frame. The second node determines the transmit time of the first message based on a payload field of the corresponding frame. The second node locally stores the arrival time of the first message and the transmit time of the first message for further processing.

As further shown in FIG. 2A, and by reference number 206, the second node determines a transmission delay (e.g., $Delay_{1 \to 2}$) with the first node. For example, the second node determines the transmission delay based on the transmit time of the first message and the arrival time of the first message. The second node causes clock synchronization (e.g., one-way synchronization) to be performed with the first node based on the transmission delay.

As further shown in FIG. 2A, and by reference number 208, the first node transmits a second message to the third node for performing clock synchronization via the communication bus. The second message is specifically intended for the third node. Similar to as described above with respect to reference number 202, a frame of the second message includes an identifier field with information identifying the first node as a sender of the second message and/or the third node as an intended recipient of the second message. The frame includes a payload field with information indicating a transmit time of the second message. The frame indicates information that enables the third node to determine a transmission delay (e.g., $Delay_{1 \to n}$) with the first node.

As further shown in FIG. 2A, and by reference number 210, the third node determines an arrival time of the second message transmitted by the first node. Similar to as described above with respect to reference number 204, the third node receives the second message transmitted by the first node, determines the arrival time of the second message, and locally stores the arrival time of the second message. The third node identifies the first node as a sender of the second message based on a unique identifier and/or other information indicated by an identifier field of the corresponding frame. The third node determines the transmit time of the second message based on a payload field of the corresponding frame. The third node locally stores the arrival time of the second message and the transmit time of the second message for further processing.

As further shown in FIG. 2A, and by reference number 212, the third node determines a transmission delay (e.g., $Delay_{1 \to n}$) with the first node. Similar to as described above with respect to reference number 206, the third node determines the transmission delay based on the transmit time of the second message and the arrival time of the second message. The third node causes clock synchronization (e.g., one-way synchronization) to be performed with the first node based on the transmission delay.

As shown in FIG. 2B, and by reference number 214, the second node transmits a first response message to the first node via the communication bus. The first response message is specifically intended for the first node. For example, a frame of the first response message includes an identifier field with information identifying the second node as a sender of the first response message and/or the first node as an intended recipient of the first response message. The frame includes a payload field with information indicating a transmit time of the first response message and/or an arrival time of the first message. For example, the frame indicates information that enables the first node to determine a transmission delay (e.g., $Delay_{2 \to 1}$) with the second node.

As further shown in FIG. 2B, and by reference number 216, the first node determines an arrival time of the first response message transmitted by the second node. For example, the first node receives the frame corresponding to the first response message transmitted by the second node, determines the arrival time of the first response message, and locally stores the arrival time of the first response message. The first node identifies the second node as a sender of the first response message based on a unique identifier and/or other information indicated by an identifier field of the corresponding frame. The first node determines the transmit time of the first response message and/or the arrival time of the first message based on a payload field of the corresponding frame. The first node locally stores the arrival time of the first response message, the transmit time of the first response message, and/or the arrival time of the first message for further processing.

As further shown in FIG. 2B, and by reference number 218, the first node determines a transmission delay (e.g., $Delay_{2 \to 1}$) with the second node. For example, the first node determines the transmission delay based on the transmit time of the first message, the arrival time of the first message, the transmit time of the first response message, and/or the arrival time of the first response message. The first node determines the transmission delay based on $$T_{Delay} = \frac{(t'_1 - t_1) - (t'_2 - t_2)}{2} \quad (1)$$

where $T_{Delay}$ corresponds to the transmission delay, $t_1'$ corresponds to the arrival time of the first response message, $t_1$ corresponds to the transmit time of the first message, $t_2'$ corresponds to the arrival time of the first message, and $t_2$ corresponds to the transmit time of the first response message. The first node determines the transmission delay based on the transmit time of the first response message and the arrival time of the first response message. The first node causes clock synchronization (e.g., two-way synchronization) to be performed with the second node based on the transmission delay.

As further shown in FIG. 2B, and by reference number 220, the third node transmits a second response message to the first node via the communication bus. The second response message is specifically intended for the first node. Similar to as described above with respect to reference number 214, a frame of the second response message includes an identifier field with information identifying the third node as a sender of the second response message and/or the first node as an intended recipient of the second response message. The frame includes a payload field with information indicating a transmit time of the second response message and/or an arrival time of the second message. For example, the frame indicates information that enables the first node to determine a transmission delay (e.g., Delay$_{n \to 1}$) with the third node.

As further shown in FIG. 2B, and by reference number 222, the first node determines an arrival time of the second response message transmitted by the third node. Similar to as described above with respect to reference number 216, the first node receives the frame corresponding to the second response message transmitted by the third node, determines the arrival time of the second response message, and locally stores the arrival time of the second response message. The first node identifies the third node as a sender of the second response message based on a unique identifier and/or other information indicated by an identifier field of the corresponding frame. The first node determines the transmit time of the second response message and/or the arrival time of the second message based on a payload field of the corresponding frame. The first node locally stores the arrival time of the second response message, the transmit time of the second response message, and/or the arrival time of the second message for further processing.

As further shown in FIG. 2B, and by reference number 224, the first node determines a transmission delay (e.g., Delay$_{n \to 1}$) with the third node. Similar to as described above with respect to reference number 218, the first node determines the transmission delay based on the transmit time of the second message, the arrival time of the second message, the transmit time of the second response message, and/or the arrival time of the second response message. The first node determines the transmission delay according to a relationship described in equation (1) above. The first node determines the transmission delay based on the transmit time of the second response message and the arrival time of the second response message. The first node causes clock synchronization (e.g., two-way synchronization) to be performed with the second node based on the transmission delay.

As indicated above, FIGS. 2A-2B are provided as an implementation of a synchronization system.

FIGS. 3A-3D are diagrams of an example implementation 300 of a synchronization system described herein. As shown in FIGS. 3A-3D, the example implementation(s) 300 may include a first node (e.g., Node 1), a second node (e.g., Node 2), and a third node (e.g., Node n that is representative of one or more additional nodes) that are interconnected via a communication bus (e.g., a CAN bus). FIGS. 3A-3D present one or more functions that may be performed by the first node, the second node, and/or the third node to perform clock synchronization (e.g., via one-way synchronization, two-way synchronization, and/or the like). In some examples, the first node, the second node, and/or the third node may include a sensor, an actuator, a controller, and/or another device of an associated system. For example, the first node, the second node, and/or the third node may perform an operation associated with a throttle function, a steering function, a braking function, a gear selection function, and/or another function of a vehicle system. In some examples, the first node, the second node, and/or the third node may perform an operation associated with an industrial system, a medical system, a robotics system, and/or another CAN-based system. One or more of the functions, described as being performed by the first node, may be performed by the second node and/or the third node, and/or one or more of the functions, described as being performed by the second node and/or the third node, may be performed by the first node.

Figure 3A:
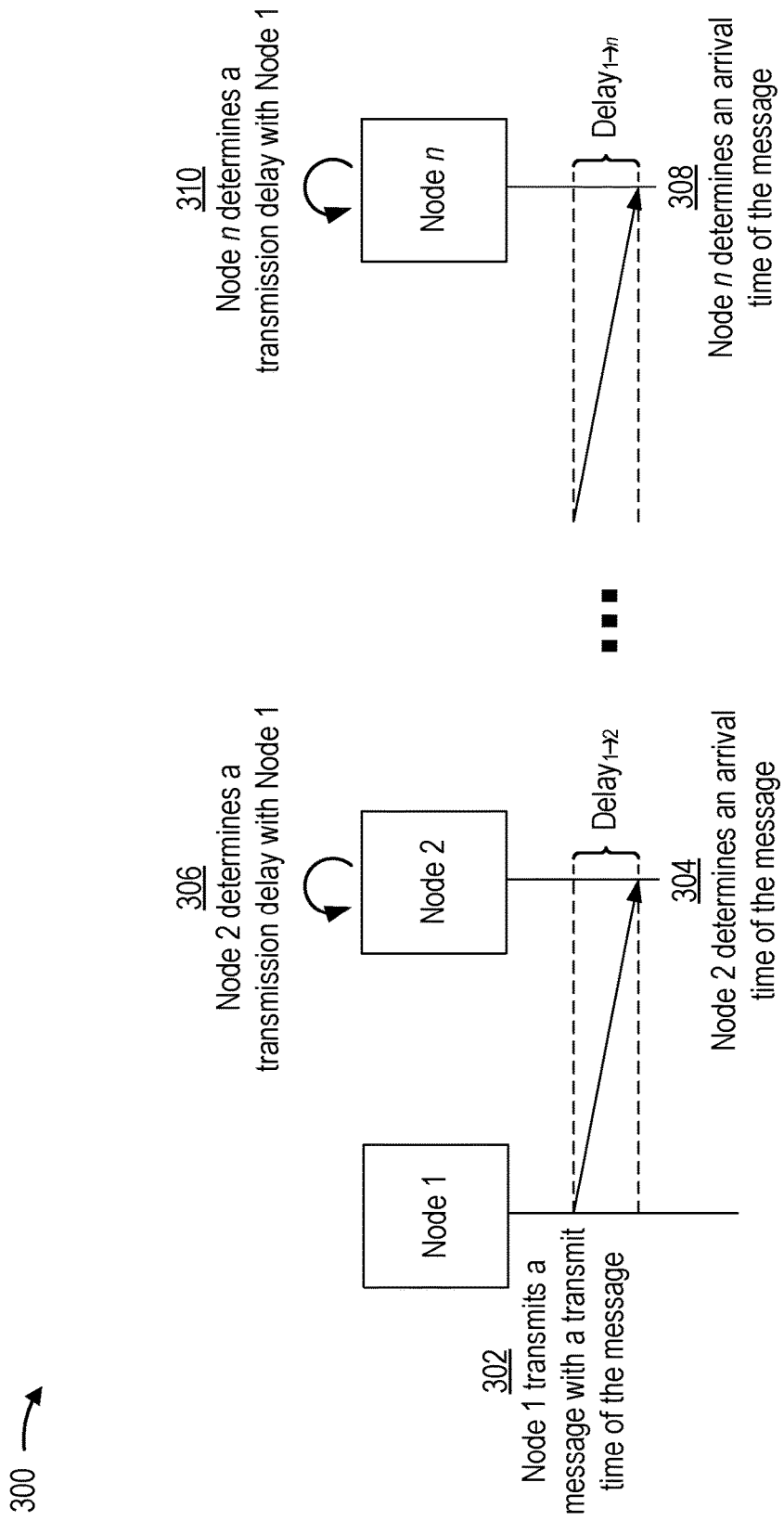
FIGS. 3A-3D are diagrams of an example implementation of a synchronization system described herein.

As shown in FIG. 3A, and by reference number 302, the first node may transmit a message (e.g., a frame of bits corresponding to the message) for performing clock synchronization via the communication bus. The message may be intended for a plurality of nodes of the communication bus, and may include information that can be used to contemporaneously perform clock synchronization with the plurality of nodes. A frame of the message may include an identifier field with information (e.g., a unique identifier) identifying the first node as a sender of the message, and a payload field with information (e.g., a timestamp) indicating a transmit time of the message. For example, the frame may indicate information that enables the second node to determine a transmission delay (e.g., Delay$_{1 \to 2}$) with the first node, and enables the third node to determine a transmission delay (e.g., Delay$_{1 \to n}$) with the first node. In some examples, the frame may identify a node or a group of nodes for which the frame is intended. Additionally, or alternatively, the frame may be authenticated to ensure proper receipt of the message by the second node and/or the third node. The first node may transmit the message to initiate clock synchronization periodically and/or intermittently (e.g., upon startup of an associated system, per drive cycle in a vehicle system, and/or as otherwise defined at or post manufacture time).

As further shown in FIG. 3A, and by reference number 304, the second node may determine an arrival time of the message transmitted by the first node. For example, the second node may receive the message transmitted by the first node, determine the arrival time of the message, and locally store the arrival time of the message (e.g., in a local storage device of the second node). In some examples, the second node may identify the first node as a sender of the message based on a unique identifier and/or other information indicated by an identifier field of the corresponding frame. In some examples, the second node may determine the transmit time of the message based on a payload field of the corresponding frame. The second node may locally store the arrival time of the message and the transmit time of the message for further processing.

As further shown in FIG. 3A, and by reference number 306, the second node may determine a transmission delay (e.g., $Delay_{1 \to 2}$) with the first node. For example, the second node may determine the transmission delay based on the transmit time of the message and the arrival time of the message (e.g., based on a difference between the transmit time and the arrival time of the message). In some examples, the second node may cause clock synchronization (e.g., one-way synchronization) to be performed with the first node based on the transmission delay. In some examples, the second node may locally store the transmission delay with the first node (e.g., within a data structure, such as an index, a map, a table, and/or the like) to be used as a reference for future messages that are exchanged with the first node. The second node may maintain the transmission delay until a subsequent clock synchronization message is received from the first node, and/or update the transmission delay based on an updated clock synchronization message.

As further shown in FIG. 3A, and by reference number 308, the third node may determine an arrival time of the message transmitted by the first node. For example, the third node may receive the message that was transmitted by the first node and received by the second node. Similar to as described above with respect to reference number 304, the third node may determine the arrival time of the message, and locally store the arrival time of the message. In some examples, the third node may identify the first node as a sender of the message based on a unique identifier and/or other information indicated by an identifier field of the corresponding frame. In some examples, the third node may determine the transmit time of the message based on a payload field of the corresponding frame. As the message received by the third node corresponds to the message received by the second node, the transmit time determined by the third node may be the same as the transmit time determined by the second node. The third node may locally store the arrival time of the message and/or the transmit time of the message for further processing.

As further shown in FIG. 3A, and by reference number 310, the third node may determine a transmission delay (e.g., Delay with the first node. Similar to as described above with respect to reference number 306, the third node may determine the transmission delay based on the transmit time of the message and the arrival time of the message. In some examples, the third node may cause clock synchronization (e.g., one-way synchronization) to be performed with the first node based on the transmission delay. In some examples, the third node may locally store the transmission delay with the first node to be used as a reference for future messages that are exchanged with the first node. The third node may maintain the transmission delay until a subsequent clock synchronization message is received from the first node, and/or update the transmission delay based on an updated clock synchronization message.

Figure 3B:
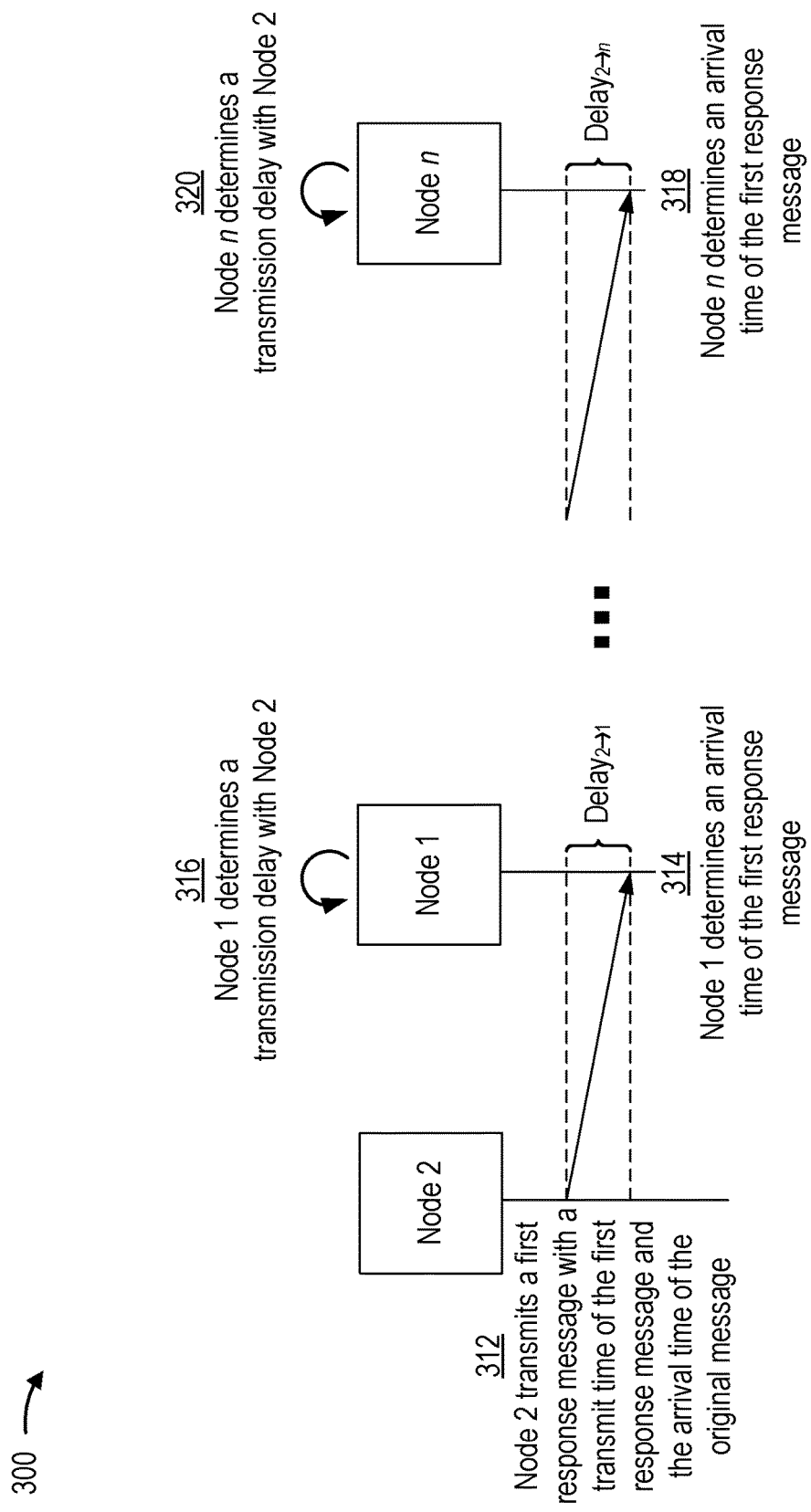

As shown in FIG. 3B, and by reference number 312, the second node may transmit a first response message via the communication bus. The first response message may be intended as a response to the original message transmitted by the first node and/or as an original message to the third node. For example, the first response message may include information that can be used to contemporaneously perform clock synchronization with the first node and the third node. A frame of the first response message may include an identifier field with information identifying the second node as a sender of the first response message, and a payload field with information indicating a transmit time of the first response message and/or an arrival time of the original message. For example, the frame may indicate information that enables the first node to determine a transmission delay (e.g., $Delay_{2 \to 1}$) with the second node, and/or enables the third node to determine a transmission delay (e.g., $Delay_{2 \to n}$) with the second node. In some examples, the frame may identify a node or a group of nodes for which the frame is intended. Additionally, or alternatively, the frame may be authenticated to ensure proper receipt of the frame by the first node and/or the third node.

As further shown in FIG. 3B, and by reference number 314, the first node may determine an arrival time of the first response message transmitted by the second node. For example, the first node may receive the frame corresponding to the first response message transmitted by the second node, determine the arrival time of the first response message, and locally store the arrival time of the first response message. In some examples, the first node may identify the second node as a sender of the first response message based on a unique identifier and/or other information indicated by an identifier field of the corresponding frame. In some examples, the first node may determine the transmit time of the first response message and/or the arrival time of the original message based on a payload field of the corresponding frame. The first node may locally store the arrival time of the first response message, the transmit time of the first response message, and/or the arrival time of the original message for further processing.

As further shown in FIG. 3B, and by reference number 316, the first node may determine a transmission delay (e.g., $Delay_{2 \to 1}$) with the second node. For example, the first node may determine the transmission delay based on the transmit time of the original message, the arrival time of the original message, the transmit time of the first response message, and/or the arrival time of the first response message. In some examples, the first node may determine the transmission delay according to a relationship described in equation (1) above. Additionally, or alternatively, the first node may determine the transmission delay based on the transmit time of the first response message and the arrival time of the first response message. In some examples, the first node may cause clock synchronization (e.g., two-way synchronization) to be performed with the second node based on the transmission delay. In some examples, the first node may locally store the transmission delay with the second node to be used as a reference for future messages that are exchanged with the second node. The first node may maintain the transmission delay until a subsequent clock synchronization message is received from the second node, and/or update the transmission delay based on an updated clock synchronization message.

As further shown in FIG. 3B, and by reference number 318, the third node may determine an arrival time of the first response message transmitted by the second node. Similar to as described above with respect to reference number 314, the third node may receive the frame corresponding to the first response message transmitted by the second node, determine the arrival time of the first response message, and locally store the arrival time of the first response message. In some examples, the third node may identify the second node as a sender of the first response message based on a unique identifier and/or other information indicated by an identifier field of the corresponding frame. In some examples, the third node may determine the transmit time of the first response message based on a payload field of the corresponding frame. The third node may locally store the arrival time of the first response message and/or the transmit time of the first response message for further processing. In some examples, the third node may determine and locally store the arrival time of the original message relative to the second node.

As further shown in FIG. 3B, and by reference number 320, the third node may determine a transmission delay (e.g., $Delay_{2 \to n}$) with the second node. Similar to as described above with respect to reference number 316, the third node may determine the transmission delay based on the transmit time of the first response message and/or the arrival time of the first response message. In some examples, the third node may cause clock synchronization (e.g., one-way synchronization) to be performed with the second node based on the transmission delay. In some examples, the third node may locally store the transmission delay with the second node to be used as a reference for future messages that are exchanged with the second node. The third node may maintain the transmission delay until a subsequent clock synchronization message is received from the second node, and/or update the transmission delay based on an updated clock synchronization message.

Figure 3C:
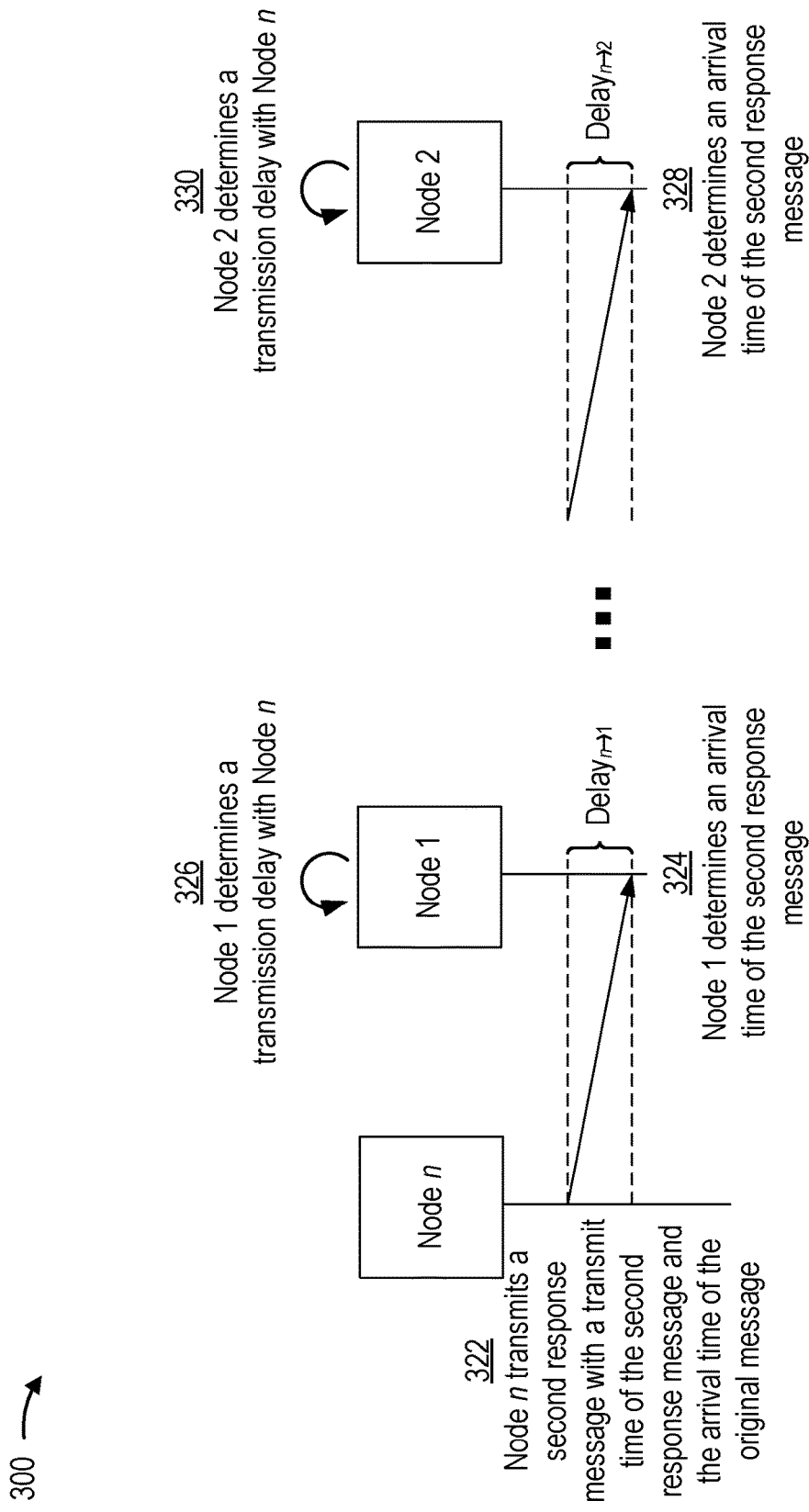

As shown in FIG. 3C, and by reference number 322, the third node may transmit a second response message via the communication bus. The second response message may be intended as a response to the original message transmitted by the first node and/or as a response to the first response message transmitted by the second node. For example, the second response message may include information that can be used to contemporaneously perform clock synchronization with the first node and the second node. A frame of the second response message may include an identifier field with information identifying the third node as a sender of the second response message, and a payload field with information indicating a transmit time of the second response message, an arrival time of the original message, and/or an arrival time of the first response message. For example, the frame may indicate information that enables the first node to determine a transmission delay (e.g., $Delay_{n \to 1}$) with the third node, and enables the second node to determine a transmission delay (e.g., $Delay_{n \to 2}$) with the third node. In some examples, the frame may identify a node or a group of nodes for which the second response message is intended. Additionally, or alternatively, the frame may be authenticated to ensure proper receipt of the second response message by the first node and/or the second node.

As further shown in FIG. 3C, and by reference number 324, the first node may determine an arrival time of the second response message transmitted by the third node. For example, the first node may receive the frame corresponding to the second response message, determine the arrival time of the second response message, and locally store the arrival time of the second response message. In some examples, the first node may identify the third node as a sender of the second response message based on a unique identifier and/or other information indicated by an identifier field of the corresponding frame. In some examples, the first node may determine the transmit time of the second response message, the arrival time of the original message, and/or the arrival time of the first response message based on a payload field of the corresponding frame. The first node may locally store the arrival time of the second response message, the transmit time of the second response message, and/or the arrival time of the original message for further processing. In some examples, the first node may locally store the arrival time of the first response message relative to the third node.

As further shown in FIG. 3C, and by reference number 326, the first node may determine a transmission delay (e.g., $Delay_{n \to 1}$) with the third node. For example, the first node may determine the transmission delay based on the transmit time of the original message, the arrival time of the original message, the transmit time of the second response message, and/or the arrival time of the second response message. In some examples, the first node may determine the transmission delay according to a relationship described in equation (1) above. Additionally, or alternatively, the first node may determine the transmission delay based on the transmit time of the second response message and the arrival time of the second response message. In some examples, the first node may cause clock synchronization (e.g., two-way synchronization) to be performed with the third node based on the transmission delay. In some examples, the first node may locally store the transmission delay with the third node to be used as a reference for future messages that are exchanged with the third node. The first node may maintain the transmission delay until a subsequent clock synchronization message is received from the third node, and/or update the transmission delay based on an updated clock synchronization message.

As further shown in FIG. 3C, and by reference number 328, the second node may determine an arrival time of the second response message transmitted by the third node. Similar to as described above with respect to reference number 324, the second node may receive the frame corresponding to the second response message transmitted by the third node, determine the arrival time of the second response message, and locally store the arrival time of the second response message. In some examples, the second node may identify the third node as a sender of the second response message based on a unique identifier and/or other information indicated by an identifier field of the corresponding frame. In some examples, the second node may determine the transmit time of the second response message, the arrival time of the original message, and/or the arrival time of the first response message based on a payload field of the corresponding frame. The second node may locally store the arrival time of the second response message, the transmit time of the second response message, and/or the arrival time of the first response message for further processing. In some examples, the second node may locally store the arrival time of the original message relative to the third node.

As further shown in FIG. 3C, and by reference number 330, the second node may determine a transmission delay (e.g., $Delay_{n \to 2}$) with the third node. Similar to as described above with respect to reference number 326, the second node may determine the transmission delay based on the transmit time of the first response message, the arrival time of the first response message, the transmit time of the second response message, and/or the arrival time of the second response message. In some examples, the second node may determine the transmission delay according to a relationship described in equation (1) above. Additionally, or alternatively, the second node may determine the transmission delay based on the transmit time of the second response message and the arrival time of the second response message. In some examples, the second node may cause clock synchronization (e.g., two-way synchronization) to be performed with the third node based on the transmission delay. In some examples, the second node may locally store the transmission delay with the third node to be used as a reference for future messages that are exchanged with the third node. The second node may maintain the transmission delay until a subsequent clock synchronization message is received from the third node, and/or update the transmission delay based on an updated clock synchronization message.

In some implementations, the first node, the second node, and/or the third node may be configured to exchange messages (e.g., original messages, response messages, and/or the like) according to a clock synchronization schedule. For example, the clock synchronization schedule may identify the nodes of the communication bus (e.g., based on respective unique identifiers) and define a sequence, an order, a pattern, and/or a routine by which nodes are to synchronize with one another. In some examples, the clock synchronization schedule may be defined based on respective measures of priority of the nodes. For example, a measure of priority of a node may be determined based on a type of an operation associated with the node, a unique identifier of the node (e.g., a combination of dominant and/or recessive bits of an identifier field of a frame transmitted by the node), and/or the like. During clock synchronization, a node may refer to the clock synchronization schedule, and determine transmission delays with other nodes in an order corresponding to the respective measures of priority. In some examples, the clock synchronization schedule may be fixed (e.g., designated at or after manufacture time and/or the like). In some examples, the clock synchronization schedule may be adjustable based on changes in environmental factors of the associated system, operating conditions of the associated system, respective operations of the nodes, and/or the like.

Figure 3D:
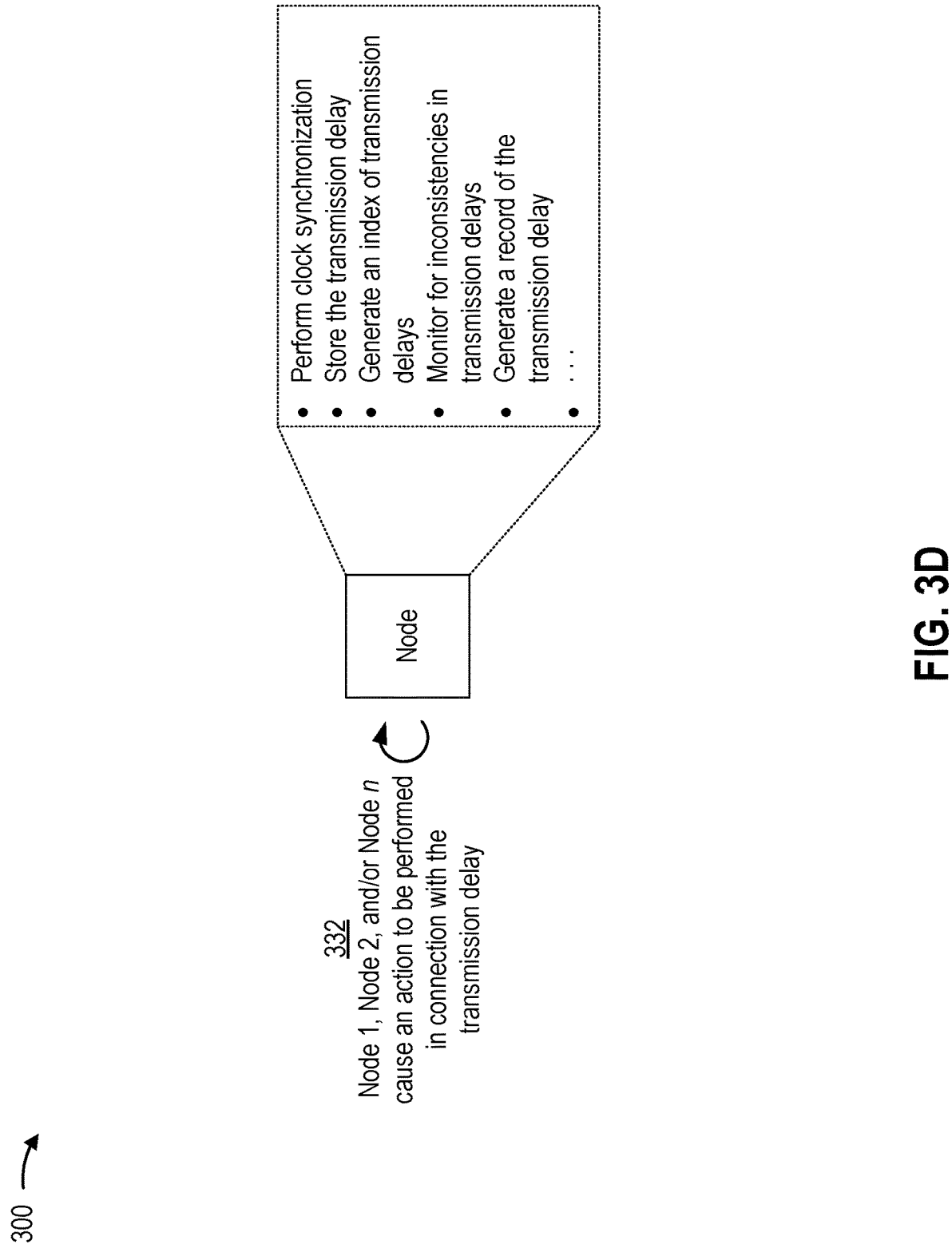

As shown in FIG. 3D, and by reference number 332, a node of the communication bus (e.g., the first node, the second node, and/or the third node) may cause an action to be performed in connection with one or more of previously determined transmission delays. As described above, a node may cause clock synchronization (e.g., via one-way synchronization and/or two-way synchronization) to be performed with other nodes of the communication bus based on the respective transmission delays. In some examples, a node may cause a record of information relating to the respective transmission delays to be generated and stored in a local storage device and/or the like. In some examples, a node may cause an index of the respective transmission delays to be generated and stored in a local storage device and/or another storage device that may be shared with and referenced by the other nodes of the communication bus. Additionally, or alternatively, a node may monitor for inconsistences in transmission delays. For example, a node may compare a previously recorded transmission delay with a subsequently observed transmission delay, and identify an inconsistency based on determining that the subsequently observed transmission delay differs from the previously recorded transmission delay by a threshold amount. In some examples, a node may cause clock synchronization to be initiated based on identifying an inconsistency in transmission delays.

In this way, implementation(s) 300 may significantly reduce a number of messages that are exchanged in order to perform clock synchronization within a communication bus (e.g., a CAN bus) without compromising authentication and without adversely affecting accuracy. For example, in a communication bus with n nodes, implementation(s) 300 may enable two-way clock synchronization with n messages rather than n(n−1) messages as with current two-way synchronization procedures. By using fewer messages, implementation(s) 300 completes clock synchronization in a shorter period of time and spends significantly less time on the communication bus. Implementation(s) 300 thereby enables the communication bus to be used for other important operations of an associated system. Also, by using fewer messages, implementation(s) 300 reduces a susceptibility to error that may result from exchanging excess messages. Furthermore, by using fewer messages and spending less time on the communication bus, implementation(s) 300 conserves resources (e.g., processor resources, memory resources, transceiver resources, bus resources, and/or the like) that may otherwise be used to perform clock synchronization.

As indicated above, FIGS. 3A-3D are provided merely as examples. Other examples are possible and may differ from what is described with regard to FIGS. 3A-3D.

Figure 4A:
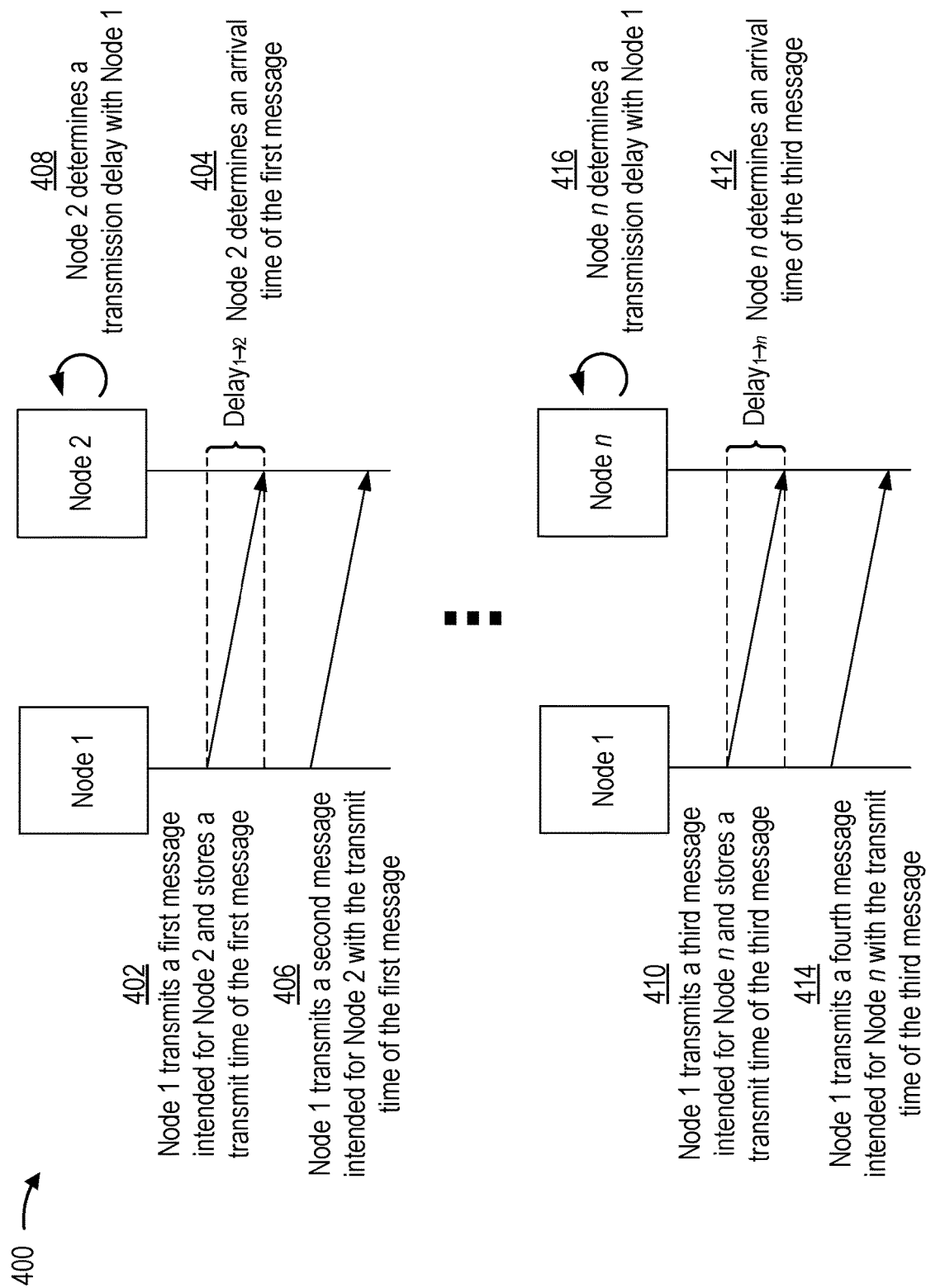
FIGS. 4A-4B are diagrams of an implementation of a synchronization system.
Figure 4B:
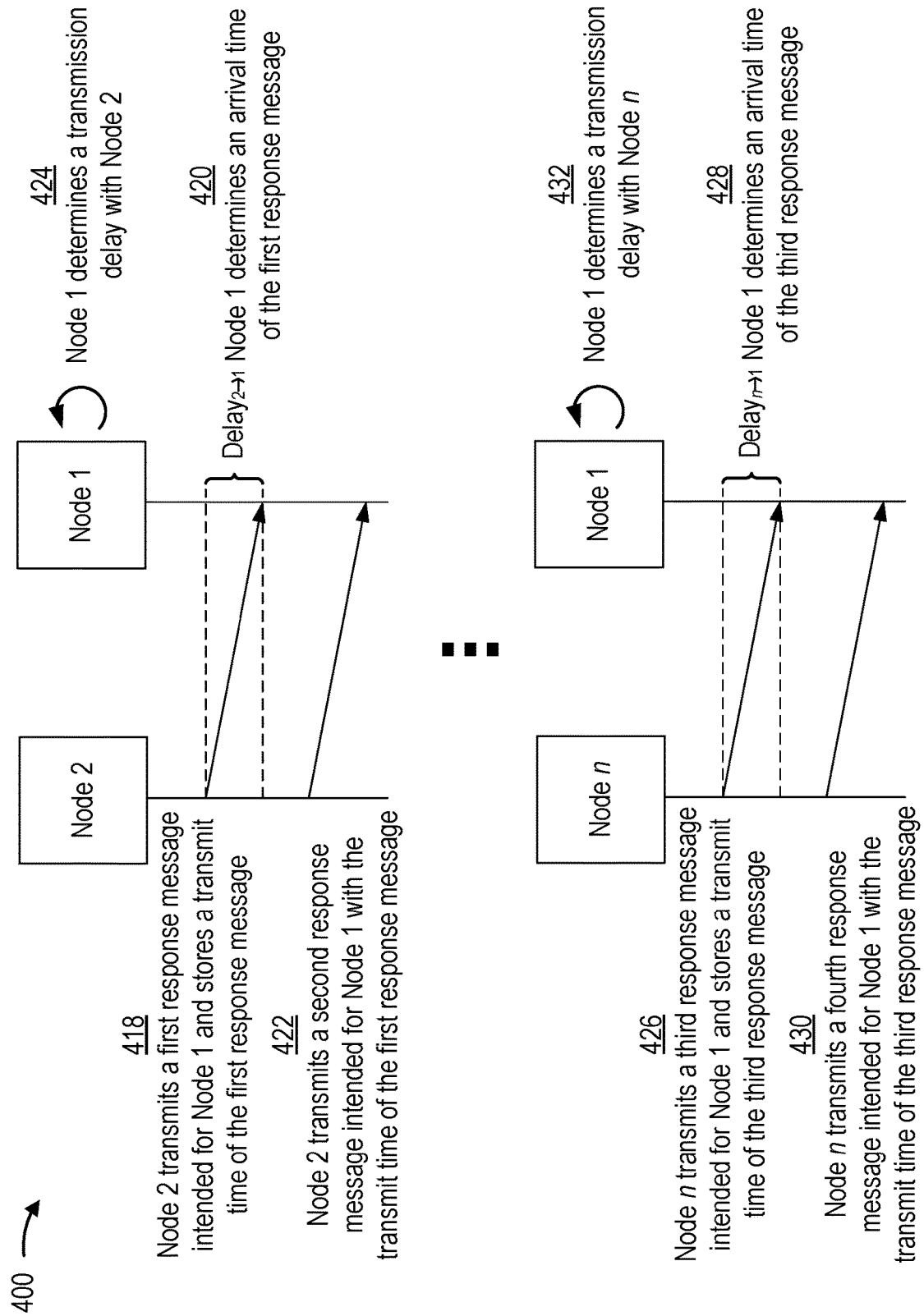

FIGS. 4A-4B are diagrams of an implementation 400 of a synchronization system. As shown in FIGS. 4A-4B, implementation 400 includes a first node (e.g., Node 1), a second node (e.g., Node 2), and a third node (e.g., Node n) that are interconnected via a communication bus (e.g., a CAN bus). FIGS. 4A-4B present one or more functions performed by the first node, the second node, and/or the third node to perform clock synchronization (e.g., via four-way synchronization).

As shown in FIG. 4A, and by reference number 402, the first node transmits a first message to the second node for performing clock synchronization via the communication bus and locally stores a transmit time of the first message. The first message is specifically intended for the second node. A frame of the first message includes an identifier field with information identifying the first node as a sender of the first message and/or the second node as an intended recipient of the first message.

As further shown in FIG. 4A, and by reference number 404, the second node determines an arrival time of the first message transmitted by the first node. For example, the second node receives the first message transmitted by the first node, determines the arrival time of the first message, and locally stores the arrival time of the first message. The second node identifies the first node as a sender of the first message based on a unique identifier and/or other information indicated by an identifier field of the corresponding frame.

As further shown in FIG. 4A, and by reference number 406, the first node transmits a second message to the second node via the communication bus. Similar to as described above with respect to reference number 402, the second message is specifically intended for the second node. A frame of the second message includes an identifier field with information identifying the first node as a sender of the second message, and a payload field with information indicating a transmit time of the first message.

As further shown in FIG. 4A, and by reference number 408, the second node determines a transmission delay (e.g., $Delay_{1 \rightarrow 2}$) with the first node. For example, the second node determines the transmission delay based on the transmit time of the first message and the arrival time of the first message. The second node causes clock synchronization to be performed with the first node based on the transmission delay.

As further shown in FIG. 4A, and by reference number 410, the first node transmits a third message to the third node for performing clock synchronization via the communication bus. The third message is specifically intended for the third node. Similar to as described above with respect to reference number 402, a frame of the third message includes an identifier field with information identifying the first node as a sender of the third message and/or the third node as an intended recipient of the third message.

As further shown in FIG. 4A, and by reference number 412, the third node determines an arrival time of the third message transmitted by the first node. Similar to as described above with respect to reference number 404, the third node receives the third message transmitted by the first node, determines the arrival time of the third message, and locally stores the arrival time of the third message. The third node identifies the first node as a sender of the third message based on a unique identifier and/or other information indicated by an identifier field of the corresponding frame.

As further shown in FIG. 4A, and by reference number 414, the first node transmits a fourth message to the third node via the communication bus. Similar to as described above with respect to reference number 406, the fourth message is specifically intended for the third node. A frame of the fourth message includes an identifier field with information identifying the first node as a sender of the fourth message, and a payload field with information indicating a transmit time of the third message.

As further shown in FIG. 4A, and by reference number 416, the third node determines a transmission delay (e.g., $Delay_{1 \to n}$) with the first node. Similar to as described above with respect to reference number 408, the third node determines the transmission delay based on the transmit time of the third message and the arrival time of the third message. The third node causes clock synchronization to be performed with the first node based on the transmission delay.

As shown in FIG. 4B, and by reference number 418, the second node transmits a first response message to the first node via the communication bus. The first response message is specifically intended for the first node. A frame of the first response message includes an identifier field with information identifying the second node as a sender of the first response message and/or the first node as an intended recipient of the first response message.

As further shown in FIG. 4B, and by reference number 420, the first node determines an arrival time of the first response message transmitted by the second node. For example, the first node receives the frame corresponding to the first response message transmitted by the second node, determines the arrival time of the first response message, and locally stores the arrival time of the first response message. The first node identifies the second node as a sender of the first response message based on a unique identifier and/or other information indicated by an identifier field of the corresponding frame.

As further shown in FIG. 4B, and by reference number 422, the second node transmits a second response message to the first node via the communication bus. Similar to as described above with respect to reference number 418, the second response message is specifically intended for the first node. A frame of the second response message includes an identifier field with information identifying the second node as a sender of the second response message, and a payload field with information indicating a transmit time of the first response message.

As further shown in FIG. 4B, and by reference number 424, the first node determines a transmission delay (e.g., $Delay_{2 \to 1}$) with the second node. For example, the first node determines the transmission delay based on the transmit time of the first message, the arrival time of the first message, the transmit time of the first response message, and/or the arrival time of the first response message. The first node determines the transmission delay according to a relationship described in equation (1) above. The first node determines the transmission delay based on the transmit time of the first response message and the arrival time of the first response message. The first node causes clock synchronization (e.g., four-way synchronization) to be performed with the second node based on the transmission delay.

As further shown in FIG. 4B, and by reference number 426, the third node transmits a third response message via the communication bus. The third response message is specifically intended for the first node. Similar to as described above with respect to reference number 418, a frame of the third response message includes an identifier field with information identifying the third node as a sender of the third response message and/or the first node as an intended recipient of the third response message.

As further shown in FIG. 4B, and by reference number 428, the first node determines an arrival time of the third response message transmitted by the third node. Similar to as described above with respect to reference number 420, the first node receives the frame corresponding to the third response message transmitted by the third node, determines the arrival time of the third response message, and stores the arrival time of the third response message. The first node identifies the third node as a sender of the third response message based on a unique identifier and/or other information indicated by an identifier field of the corresponding frame.

As further shown in FIG. 4B, and by reference number 430, the third node transmits a fourth response message to the first node via the communication bus. Similar to as described above with respect to reference number 422, the fourth response message is specifically intended for the first node. A frame of the fourth response message includes an identifier field with information identifying the third node as a sender of the fourth response message, and a payload field with information indicating a transmit time of the third response message.

As further shown in FIG. 4B, and by reference number 432, the first node determines a transmission delay (e.g., $Delay_{n \to 1}$) with the third node. Similar to as described above with respect to reference number 424, the first node determines the transmission delay based on the transmit time of the third message, the arrival time of the third message, the transmit time of the fourth response message, and/or the arrival time of the fourth response message. The first node determines the transmission delay according to a relationship described in equation (1) above. The first node determines the transmission delay based on the transmit time of the third response message and the arrival time of the third response message. The first node causes clock synchronization (e.g., four-way synchronization) to be performed with the third node based on the transmission delay.

As indicated above, FIGS. 4A-4B are provided as an implementation of a synchronization system.

FIGS. 5A-5D are diagrams of an example implementation 500 of a synchronization system described herein. As shown in FIGS. 5A-5D, the example implementation(s) 500 may include a first node (e.g., Node 1), a second node (e.g., Node 2), and a third node (e.g., Node n that is representative of one or more additional nodes) that are interconnected via a communication bus (e.g., a CAN bus). FIGS. 5A-5D present one or more functions that may be performed by the first node, the second node, and/or the third node to perform clock synchronization (e.g., via four-way synchronization and/or the like). Similar to as described above with respect to implementation(s) 300, the first node, the second node, and/or the third node may include a sensor, an actuator, a controller, and/or another device of an associated system. In some examples, the first node, the second node, and/or the third node may perform an operation associated with a vehicle system, an industrial system, a medical system, a robotics system, and/or another CAN-based system.

Figure 5A:
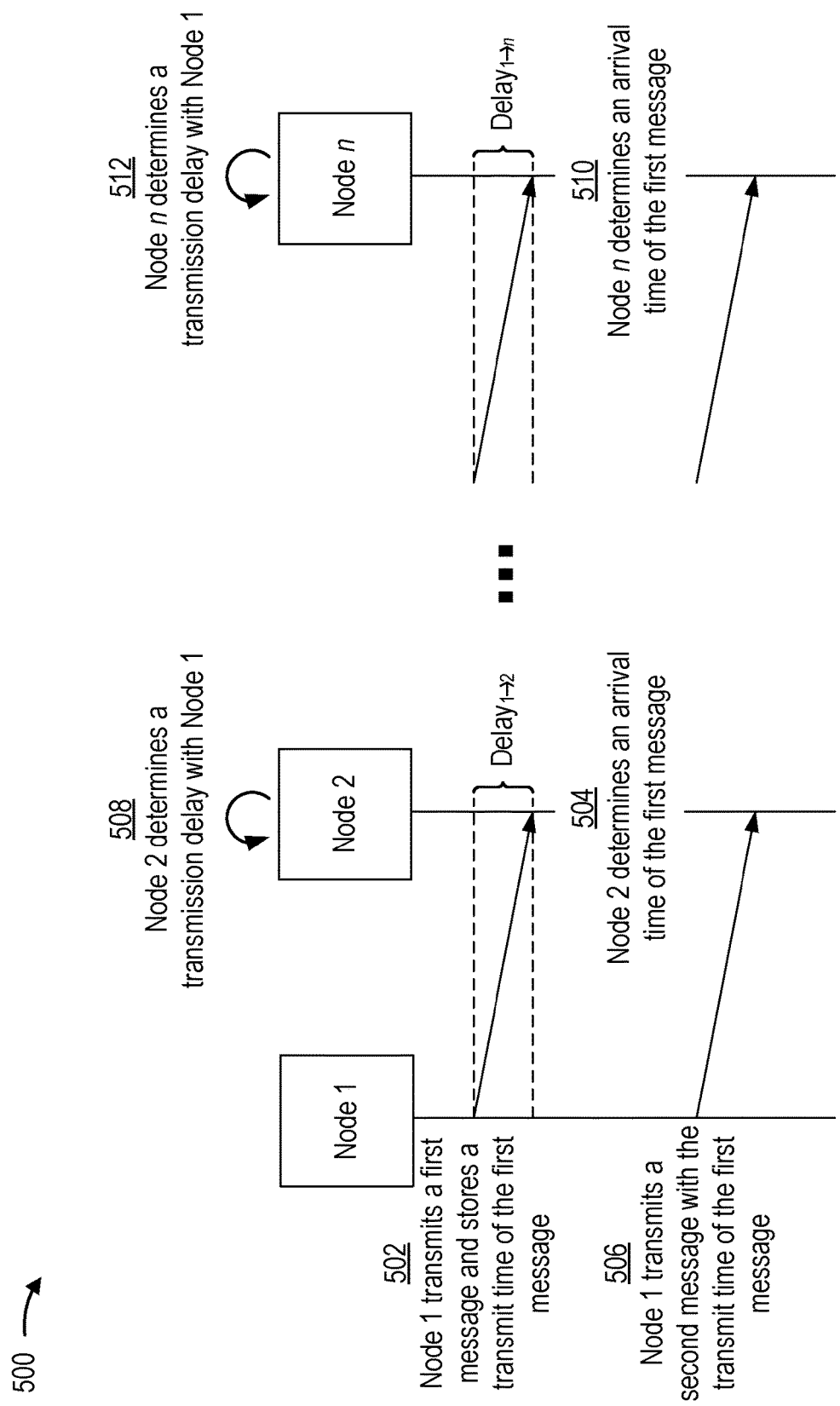
FIGS. 5A-5D are diagrams of an example implementation of a synchronization system described herein.

As shown in FIG. 5A, and by reference number 502, the first node may transmit a first message for performing clock synchronization via the communication bus and locally store a transmit time of the first message. The first message may be intended for a plurality of nodes of the communication bus, and may include information that can be used to contemporaneously perform clock synchronization with the plurality of nodes. A frame of the first message may include an identifier field with information that enables the second node and/or the third node to identify the first node as a sender of the first message. In some examples, the frame may identify a node or a group of nodes for which the frame is intended. Additionally, or alternatively, the frame may be authenticated to ensure proper receipt of the first message by the second node and/or the third node. The first node may transmit the first message to initiate clock synchronization periodically and/or intermittently.

As further shown in FIG. 5A, and by reference number 504, the second node may determine an arrival time of the first message transmitted by the first node. For example, the second node may receive the first message transmitted by the first node, determine the arrival time of the first message, and locally store the arrival time of the first message. In some examples, the second node may identify the first node as a sender of the first message based on a unique identifier and/or other information indicated by an identifier field of the corresponding frame, and associate the first node with the arrival time of the first message.

As further shown in FIG. 5A, and by reference number 506, the first node may transmit a second message via the communication bus. Similar to as described above with respect to reference number 502, the second message may be intended for a plurality of nodes of the communication bus. A frame of the second message may include an identifier field with information identifying the first node as a sender of the second message, and a payload field with information indicating a transmit time of the first message. For example, the frame may indicate information that enables the second node to determine a transmission delay (e.g., $Delay_{1 \rightarrow 2}$) with the first node, and enables the third node to determine a transmission delay (e.g., $Delay_{1 \rightarrow n}$) with the first node.

As further shown in FIG. 5A, and by reference number 508, the second node may determine a transmission delay (e.g., $Delay_{1 \rightarrow 2}$) with the first node. For example, the second node may determine the transmission delay based on the transmit time of the first message and the arrival time of the first message (e.g., based on a difference between the transmit time and the arrival time of the first message). The second node may determine the transmit time of the first message based on a payload field of the frame associated with the second message. In some examples, the second node may cause clock synchronization to be performed with the first node based on the transmission delay. In some examples, the second node may locally store the transmission delay with the first node to be used as a reference for future messages that are exchanged with the first node. The second node may maintain the transmission delay until a subsequent clock synchronization message is received from the first node, and/or update the transmission delay based on an updated clock synchronization message.

As further shown in FIG. 5A, and by reference number 510, the third node may determine an arrival time of the first message transmitted by the first node. Similar to as described above with respect to reference number 504, the third node may determine the arrival time of the first message, and locally store the arrival time of the first message. In some examples, the third node may identify the first node as a sender of the first message based on a unique identifier and/or other information indicated by an identifier field of the corresponding frame, and associate the first node with the arrival time of the first message.

As further shown in FIG. 5A, and by reference number 512, the third node may determine a transmission delay (e.g., Delay with the first node. Similar to as described above with respect to reference number 508, the third node may determine the transmission delay based on the transmit time of the first message and the arrival time of the first message. The third node may determine the transmit time of the first message based on a payload field of the frame associated with the second message. In some examples, the third node may cause clock synchronization to be performed with the first node based on the transmission delay. In some examples, the third node may locally store the transmission delay with the first node to be used as a reference for future messages that are exchanged with the first node. The third node may maintain the transmission delay until a subsequent clock synchronization message is received from the first node, and/or update the transmission delay based on an updated clock synchronization message.

Figure 5B:
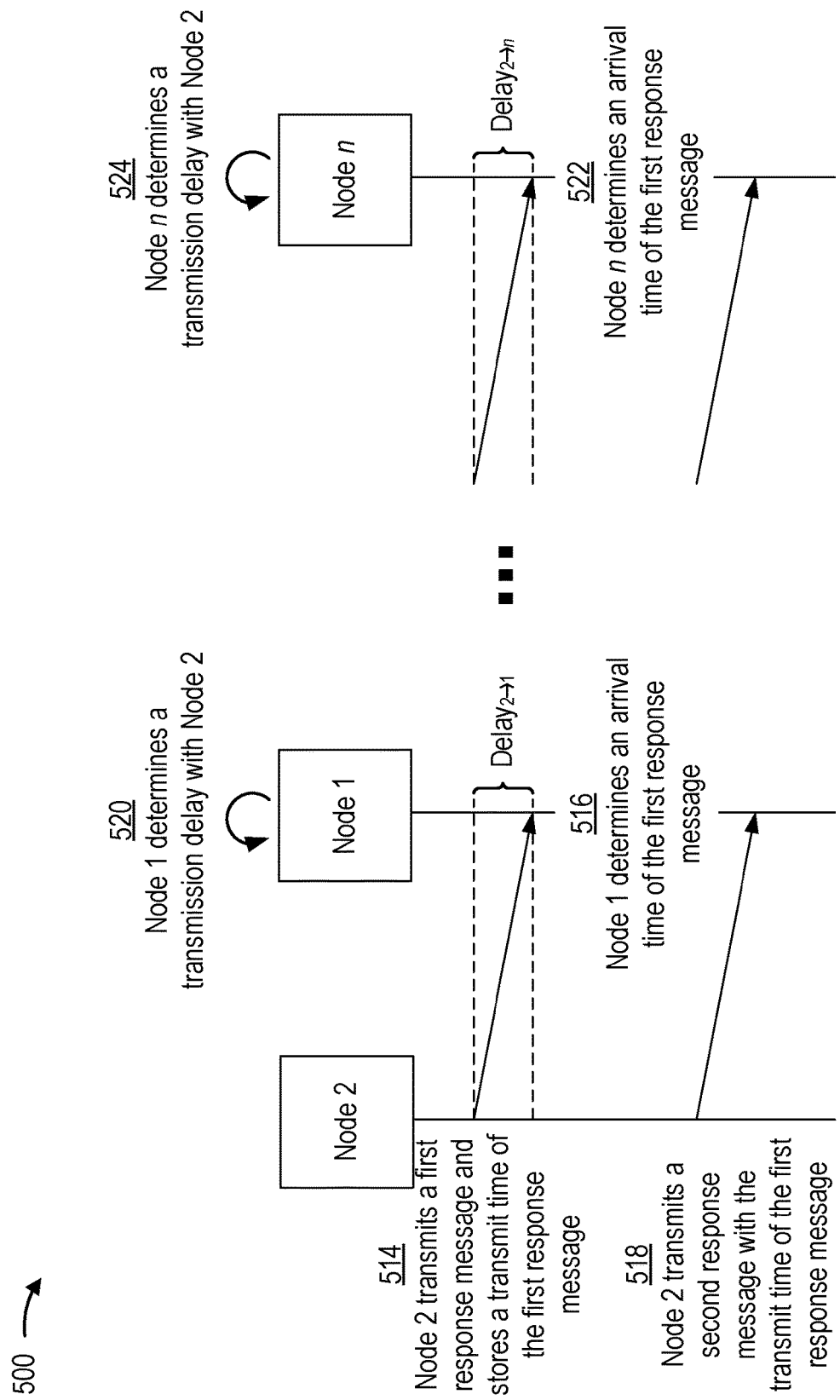

As shown in FIG. 5B, and by reference number 514, the second node may transmit a first response message via the communication bus and locally store a transmit time of the first response message. The first response message may be intended as a response to a set of original messages (e.g., the first message and/or the second message) transmitted by the first node, as an original message to the third node, and/or as an original message to one or more other nodes of the communication bus. For example, the first response message may include information that can be used to contemporaneously perform clock synchronization with the first node and the third node. A frame of the first response message may include an identifier field with information that enables the first node and/or the third node to identify the second node as a sender of the first response message. In some examples, the frame may identify a node or a group of nodes for which the frame is intended. Additionally, or alternatively, the frame may be authenticated to ensure proper receipt of the frame by the first node and/or the third node.

As further shown in FIG. 5B, and by reference number 516, the first node may determine an arrival time of the first response message transmitted by the second node. For example, the first node may receive the first response message transmitted by the second node, determine the arrival time of the first response message, and locally store the arrival time of the first response message. In some examples, the first node may identify the second node as a sender of the first response message based on a unique identifier and/or other information indicated by an identifier field of the corresponding frame, and associate the second node with the arrival time of the first response message.

As further shown in FIG. 5B, and by reference number 518, the second node may transmit a second response message via the communication bus. Similar to as described above with respect to reference number 514, the second response message may be intended for a plurality of nodes of the communication bus. A frame of the second response message may include an identifier field with information identifying the second node as a sender of the second response message, and a payload field with information indicating a transmit time of the first response message. For example, the frame may indicate information that enables the first node to determine a transmission delay (e.g., Delay$_{2\rightarrow1}$) with the second node, and enables the third node to determine a transmission delay (e.g., Delay$_{2\rightarrow n}$) with the second node.

As further shown in FIG. 5B, and by reference number 520, the first node may determine a transmission delay (e.g., Delay$_{2\rightarrow1}$) with the second node. For example, the first node may determine the transmission delay based on the transmit time of the first response message and the arrival time of the first response message. The first node may determine the transmit time of the first response message based on a payload field of the frame associated with the second response message. In some examples, the first node may cause clock synchronization to be performed with the second node based on the transmission delay. In some examples, the first node may locally store the transmission delay with the second node to be used as a reference for future messages that are exchanged with the second node. The first node may maintain the transmission delay until a subsequent clock synchronization message is received from the second node, and/or update the transmission delay based on an updated clock synchronization message.

As further shown in FIG. 5B, and by reference number 522, the third node may determine an arrival time of the first response message transmitted by the second node. Similar to as described above with respect to reference number 516, the third node may determine the arrival time of the first response message, and locally store the arrival time of the first response message. In some examples, the third node may identify the second node as a sender of the first response message based on a unique identifier and/or other information indicated by an identifier field of the corresponding frame, and associate the second node with the arrival time of the first response message.

As further shown in FIG. 5B, and by reference number 524, the third node may determine a transmission delay (e.g., Delay$_{2\rightarrow n}$) with the second node. Similar to as described above with respect to reference number 520, the third node may determine the transmission delay based on the transmit time of the first response message and the arrival time of the first response message. The third node may determine the transmit time of the first response message based on a payload field of the frame associated with the second response message. In some examples, the third node may cause clock synchronization to be performed with the second node based on the transmission delay. In some examples, the third node may locally store the transmission delay with the second node to be used as a reference for future messages that are exchanged with the second node. The third node may maintain the transmission delay until a subsequent clock synchronization message is received from the second node, and/or update the transmission delay based on an updated clock synchronization message.

Figure 5C:
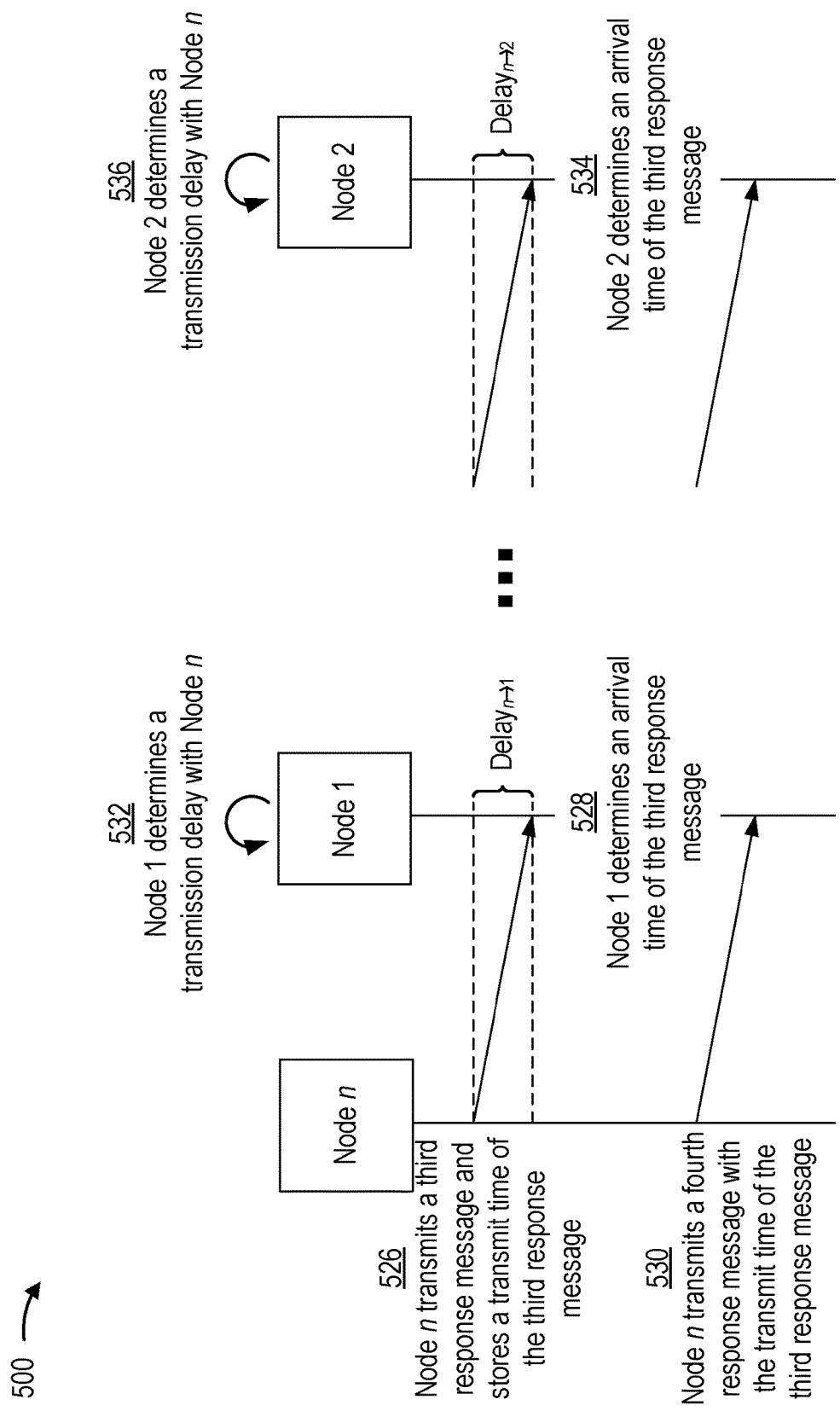

As shown in FIG. 5C, and by reference number 526, the third node may transmit a third response message via the communication bus and locally store a transmit time of the third response message. Similar to as described above with respect to reference number 514, the third response message may be intended as a response to a set of original messages (e.g., the first message and/or the second message) transmitted by the first node, as a response to a set of original messages (e.g., the first response message and/or the second response message) transmitted by the second node, and/or as an original message to one or more other nodes of the communication bus. For example, the third response message may include information that can be used to contemporaneously perform clock synchronization with the first node and the second node. A frame of the third response message may include an identifier field with information that enables the first node and/or the second node to identify the third node as a sender of the third response message. In some examples, the frame may identify a node or a group of nodes for which the frame is intended. Additionally, or alternatively, the frame may be authenticated to ensure proper receipt of the frame by the first node and/or the second node.

As further shown in FIG. 5C, and by reference number 528, the first node may determine an arrival time of the third response message transmitted by the third node. Similar to as described above with respect to reference number 516, the first node may receive the third response message transmitted by the third node, determine the arrival time of the third response message, and locally store the arrival time of the third response message. In some examples, the first node may identify the third node as a sender of the third response message based on a unique identifier and/or other information indicated by an identifier field of the corresponding frame, and associate the third node with the arrival time of the third response message.

As further shown in FIG. 5C, and by reference number 530, the third node may transmit a fourth response message via the communication bus. Similar to as described above with respect to reference number 518, the fourth response message may be intended for a plurality of nodes of the communication bus. A frame of the fourth response message may include an identifier field with information identifying the third node as a sender of the fourth response message, and a payload field with information indicating a transmit time of the third response message. For example, the frame may indicate information that enables the first node to determine a transmission delay (e.g., Delay$_{n\rightarrow1}$) with the third node, and enables the second node to determine a transmission delay (e.g., Delay$_{n\rightarrow2}$) with the third node.

As further shown in FIG. 5C, and by reference number 532, the first node may determine a transmission delay (e.g., Delay$_{n\rightarrow1}$) with the third node. Similar to as described above with respect to reference number 520, the first node may determine the transmission delay based on the transmit time of the third response message and the arrival time of the third response message. The first node may determine the transmit time of the third response message based on a payload field of the frame associated with the fourth response message. In some examples, the first node may cause clock synchronization to be performed with the third node based on the transmission delay. In some examples, the first node may locally store the transmission delay with the third node to be used as a reference for future messages that are exchanged with the third node. The first node may maintain the transmission delay until a subsequent clock synchronization message is received from the third node, and/or update the transmission delay based on an updated clock synchronization message.

As further shown in FIG. 5C, and by reference number 534, the second node may determine an arrival time of the third response message transmitted by the third node. Similar to as described above with respect to reference number 528, the second node may determine the arrival time of the third response message, and locally store the arrival time of the third response message. In some examples, the second node may identify the third node as a sender of the third response message based on a unique identifier and/or other information indicated by an identifier field of the corresponding frame, and associate the third node with the arrival time of the third response message.

As further shown in FIG. 5C, and by reference number 536, the second node may determine a transmission delay (e.g., Delay$_{n\to 2}$) with the third node. Similar to as described above with respect to reference number 532, the second node may determine the transmission delay based on the transmit time of the third response message and the arrival time of the third response message. The second node may determine the transmit time of the third response message based on a payload field of the frame associated with the fourth response message. In some examples, the second node may cause clock synchronization to be performed with the third node based on the transmission delay. In some examples, the second node may locally store the transmission delay with the third node to be used as a reference for future messages that are exchanged with the third node. The second node may maintain the transmission delay until a subsequent clock synchronization message is received from the third node, and/or update the transmission delay based on an updated clock synchronization message.

In some implementations, the first node, the second node, and/or the third node may be configured to exchange messages according to a clock synchronization schedule. As described above with respect to implementation(s) 300, the clock synchronization schedule may identify the nodes of the communication and define a sequence, an order, a pattern, and/or a routine by which nodes of the communication bus are to synchronize with one another. In some examples, the clock synchronization schedule may be defined based on respective measures of priority of the nodes. For example, a measure of priority of a node may be determined based on a type of an operation associated with the node, a unique identifier of the node, and/or the like. During clock synchronization, a node may refer to the clock synchronization schedule, and determine transmission delays with other nodes in an order corresponding to the respective measures of priority. In some examples, the clock synchronization schedule may be fixed or adjustable based on changes in environmental factors of the associated system, operating conditions of the associated system, respective operations of the nodes, and/or the like.

Figure 5D:
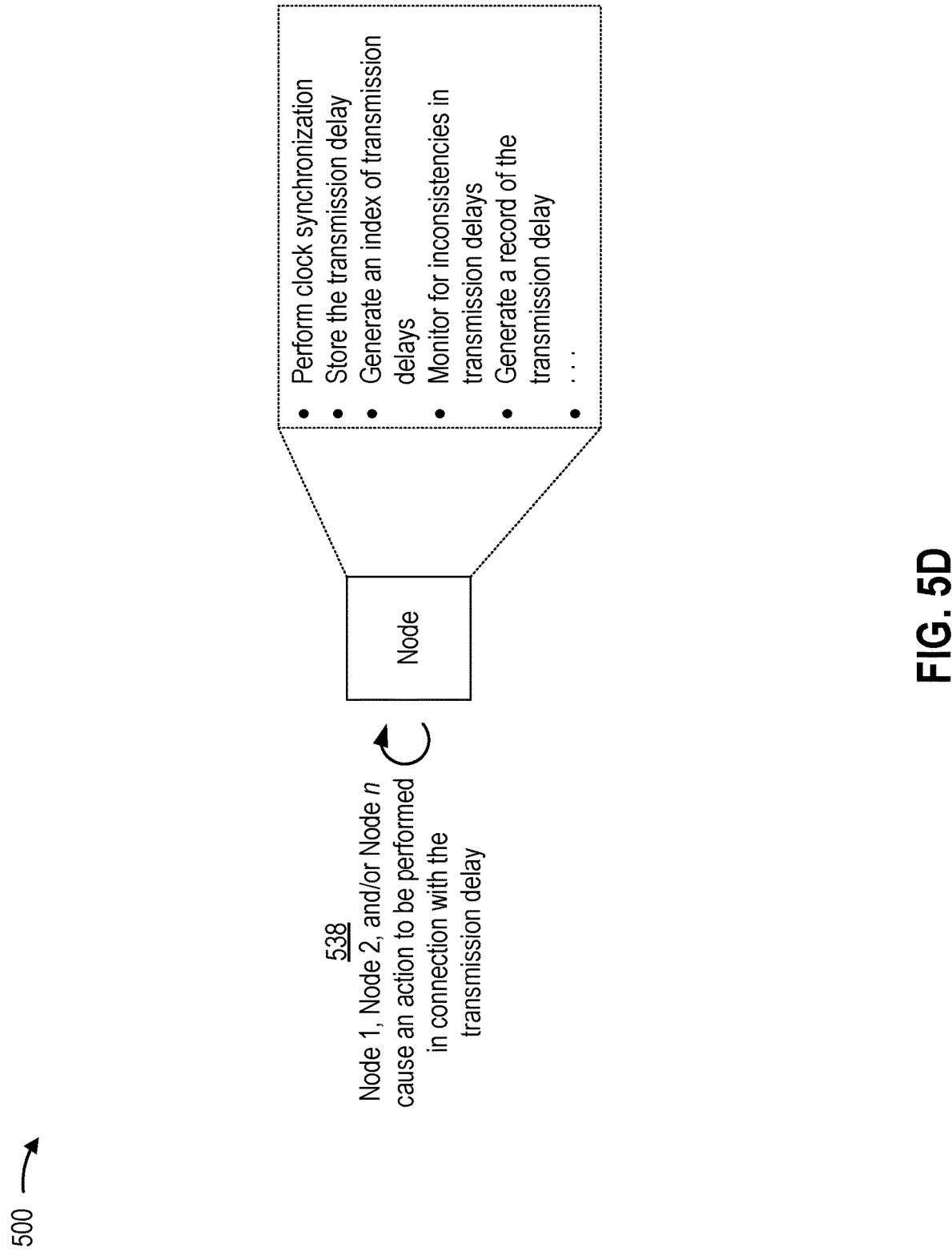

As shown in FIG. 5D, and by reference number 538, a node of the communication bus (e.g., the first node, the second node, and/or the third node) may cause an action to be performed in connection with one or more of the previously determined transmission delays, as described above with respect to reference number 332. For example, a node may cause clock synchronization (e.g., via four-way synchronization) to be performed with other nodes of the communication bus based on the respective transmission delays with the other nodes. In some examples, a node may cause a record of information relating to the respective transmission delays with the other nodes to be generated and/or stored in a local storage device and/or the like. In some examples, a node may cause an index of the respective transmission delays with the other nodes to be generated and/or stored in a local storage device and/or another storage device that may be shared with and referenced by the other nodes of the communication bus. Additionally, or alternatively, a node may monitor for inconsistences in transmission delays, and/or cause clock synchronization to be initiated based on identifying an inconsistency in transmission delays.

In this way, implementation(s) 500 may significantly reduce a number of messages that are exchanged in order to perform clock synchronization within a communication bus (e.g., a CAN bus) without compromising authentication and without adversely affecting accuracy. For example, in a communication bus with n nodes, implementation(s) 500 may enable four-way clock synchronization with 2n messages rather than 2n(n−1) messages as with current four-way synchronization procedures. By using fewer messages, implementation(s) 500 completes clock synchronization in a shorter period of time and spends significantly less time on the communication bus. Implementation(s) 500 thereby enables the communication bus to be used for other important operations of an associated system. Also, by using fewer messages, implementation(s) 500 reduces a susceptibility to error that may result from exchanging excess messages. Furthermore, by using fewer messages and spending less time on the communication bus, implementation(s) 500 conserves resources (e.g., processor resources, memory resources, transceiver resources, bus resources, and/or the like) that may otherwise be used to perform clock synchronization.

As indicated above, FIGS. 5A-5D are provided merely as examples. Other examples are possible and may differ from what is described with regard to FIGS. 5A-5D.

Figure 6:
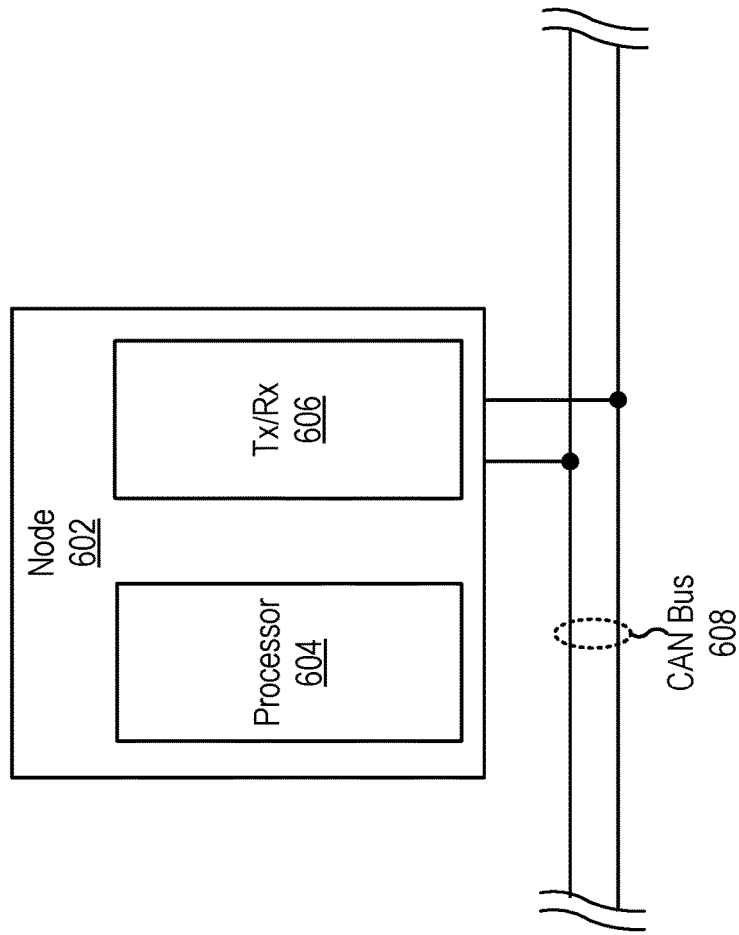
FIG. 6 is a diagram of an example environment in which systems and/or methods, described herein, may be implemented.

FIG. 6 is a diagram of an example environment 600 in which system and/or methods, described herein, may be implemented. As shown in FIG. 6, environment 600 may contain a node 602 including a processor 604 and a transceiver 606 (e.g., Tx/Rx) connected to a communication bus 608 (e.g., a CAN bus).

Node 602 includes one or more devices associated with controlling one or more electrical systems and/or electrical subsystems based, for example, on sensor data provided by sensors connected to node 602 via a sensor interface component of node 602 (not shown), control data for controlling actuators connected to node 602 via an actuator interface component of node (not shown), and/or the like. In a vehicle system, for example, node 602 may include an ECU, an ECM, a PCM, a TCM, a BCM, a CCM, a CTM, a GEM, a BCM, a SCM, or another type of electrical system or electrical subsystem of a vehicle.

Processor 604 includes a device (e.g., one or more integrated circuits) that operates as an embedded system for providing the control functionality associated with node 602. For example, processor 604 includes one or more central processing units (CPUs), memories, and/or programmable input/output (I/O) peripherals that allow processor 604 to operate as an embedded system. In some examples, processor 604 may send information to and/or receive information from transceiver 606.

Transceiver 606 includes a component via which node 602 may transmit and receive information. For example, transceiver 606 may include a differential line transceiver, or a similar type of component. In some examples, transceiver 606 includes a transmit (Tx) component that allows node 602 to transmit information (e.g., to another node) via communication bus 608, and/or a receive (Rx) component that allows node 602 to receive information (e.g., from another node that is similar to node 602) via communication bus 608. In some examples, transceiver 606 may include a line driver for enabling the Tx component (to transmit information) or the Rx component (to receive information) at a given time. In some examples, transceiver 606 may be a LIN transceiver, a CAN transceiver, a FlexRay transceiver, an Ethernet transceiver, or another type of transceiver associated with another type of communication bus system. In some examples, node 602 may include multiple transceivers 606 of different types.

Communication bus 608 includes a bus for carrying information from or to node 602. In some examples, communication bus 608 may comprise a connection (e.g., including one or more terminals, wires, and/or connectors) via which multiple nodes 602 are connected to one another.

In some examples, communication bus 608 may include a set of connections, each associated with one or more node 602. In some examples, communication bus 608 may be a CAN bus, a CAN FD bus, a CAN XL bus, a LIN bus, a FlexRay bus, an Ethernet bus, and/or another type of bus. In some examples, each transceiver 606 of node 602 may be connected to an associated communication bus 608.

The number and arrangement of apparatuses shown in FIG. 6 is provided as an example. In practice, there may be additional devices and/or components, fewer devices and/or components, different devices and/or components, or differently arranged devices and/or components than those shown in FIG. 6. For example, in some implementations, environment 600 may include multiple node 602, each connected via one or more associated communication buses 608. Furthermore, two or more devices and/or components shown in FIG. 6 may be implemented within a single device and/or component, or a single device and/or a single component shown in FIG. 6 may be implemented as multiple, distributed devices and/or components. Additionally, or alternatively, a set of devices and/or components (e.g., one or more devices and/or components) of FIG. 6 may perform one or more functions described as being performed by another set of devices and/or components of FIG. 6.

Figure 7:
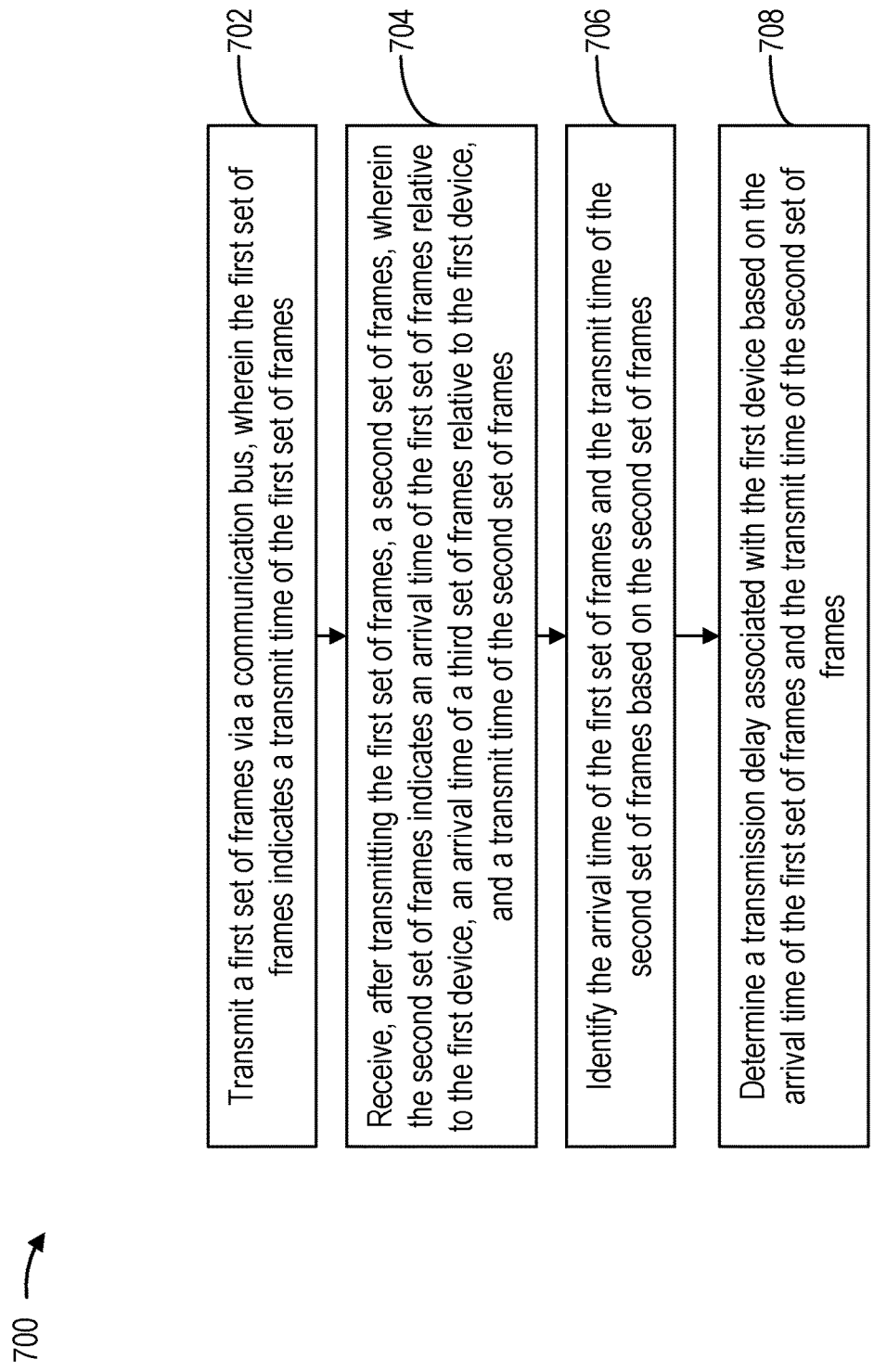
FIG. 7 is a flow chart of an example process for transmitting synchronization messages via a communication bus.

FIG. 7 is a flow chart of an example process 700 for transmitting synchronization messages via a communication bus. In some implementations, one or more process blocks of FIG. 7 may be performed by a node (e.g., node 602, a sender device, and/or the like) of a communication bus (e.g., a CAN bus). In some implementations, one or more process blocks of FIG. 7 may be performed by a single node, a set of nodes, or a subset of nodes of the communication bus.

As shown in FIG. 7, process 700 may include transmitting a first set of frames via a communication bus, wherein the first set of frames indicates a transmit time of the first set of frames (block 702). For example, the node (e.g., using processor 604, transceiver 606, and/or the like) may transmit a first set of frames via a communication bus, as described above. In some implementations, the first set of frames may indicate a transmit time of the first set of frames.

As further shown in FIG. 7, process 700 may include receiving, after transmitting the first set of frames, a second set of frames, wherein the second set of frames indicates an arrival time of the first set of frames relative to the first device, an arrival time of a third set of frames relative to the first device, and a transmit time of the second set of frames (block 704). For example, the node (e.g., using processor 604, transceiver 606, and/or the like) may receive, after transmitting the first set of frames, a second set of frames, as described above. In some implementations, the second set of frames may indicate an arrival time of the first set of frames relative to the first device, an arrival time of a third set of frames relative to the first device, and a transmit time of the second set of frames.

As further shown in FIG. 7, process 700 may include identifying the arrival time of the first set of frames and the transmit time of the second set of frames based on the second set of frames (block 706). For example, the node (e.g., using processor 604, transceiver 606, and/or the like) may identify the arrival time of the first set of frames and the transmit time of the second set of frames based on the second set of frames, as described above.

As further shown in FIG. 7, process 700 may include determining a transmission delay associated with the first device based on the arrival time of the first set of frames and the transmit time of the second set of frames (block 708). For example, the node (e.g., using processor 604, transceiver 606, and/or the like) may determine a transmission delay associated with the first device based on the arrival time of the first set of frames and the transmit time of the second set of frames, as described above.

Process 700 may include additional implementations, such as any single implementation or any combination of implementations described below and/or in connection with one or more other processes described elsewhere herein.

In a first implementation, the first set of frames may include a single frame, and the single frame may indicate the transmit time of the single frame.

In a second implementation, the first set of frames may include a first frame and a second frame. In some implementations, the second frame may be transmitted after the first frame and indicate the transmit time of the first frame.

In a third implementation, alone or in combination with one or more of the first and second implementations, the second set of frames may include a single frame, and the single frame may indicate the arrival time of the first set of frames, the arrival time of the third set of frames, and the transmit time of the single frame.

In a fourth implementation, alone or in combination with one or more of the first through third implementations, the second set of frames may include a first frame and a second frame. In some implementations, the first frame may indicate the arrival time of the first set of frames and the arrival time of the third set of frames. In some implementations, the second frame may be received after the first frame and indicate the transmit time of the first frame.

In a fifth implementation, alone or in combination with one or more of the first through fourth implementations, the arrival time of the first set of frames and the transmit time of the second set of frames may be identified based on one or more of an identifier field or a payload field of a frame of the second set of frames.

In a sixth implementation, alone or in combination with one or more of the first through fifth implementations, process 700 may further include receiving, from a second device and after transmitting the first set of frames, the third set of frames. In some implementations, the third set of frames may indicate an arrival time of the first set of frames relative to the second device and a transmit time of the third set of frames. In some implementations, process 700 may further include identifying the arrival time of the first set of frames and the transmit time of the third set of frames based on the third set of frames, and determining a transmission delay associated with the second device based on the arrival time of the first set of frames and the transmit time of the third set of frames.

In a seventh implementation, alone or in combination with one or more of the first through sixth implementations, process 700 may further include determining a measure of priority of one of the first device or a second device over a remaining one of the first device or the second device according to a clock synchronization schedule, and determining one of the transmission delay associated with the first device or a transmission delay associated with the second device before a remaining one of the transmission delay associated with the first device or the transmission delay associated with the second device based on the measure of priority.

In an eighth implementation, alone or in combination with one or more of the first through seventh implementations, process 700 may further include causing clock synchronization between the sender device and the first device to be performed based on the transmission delay.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
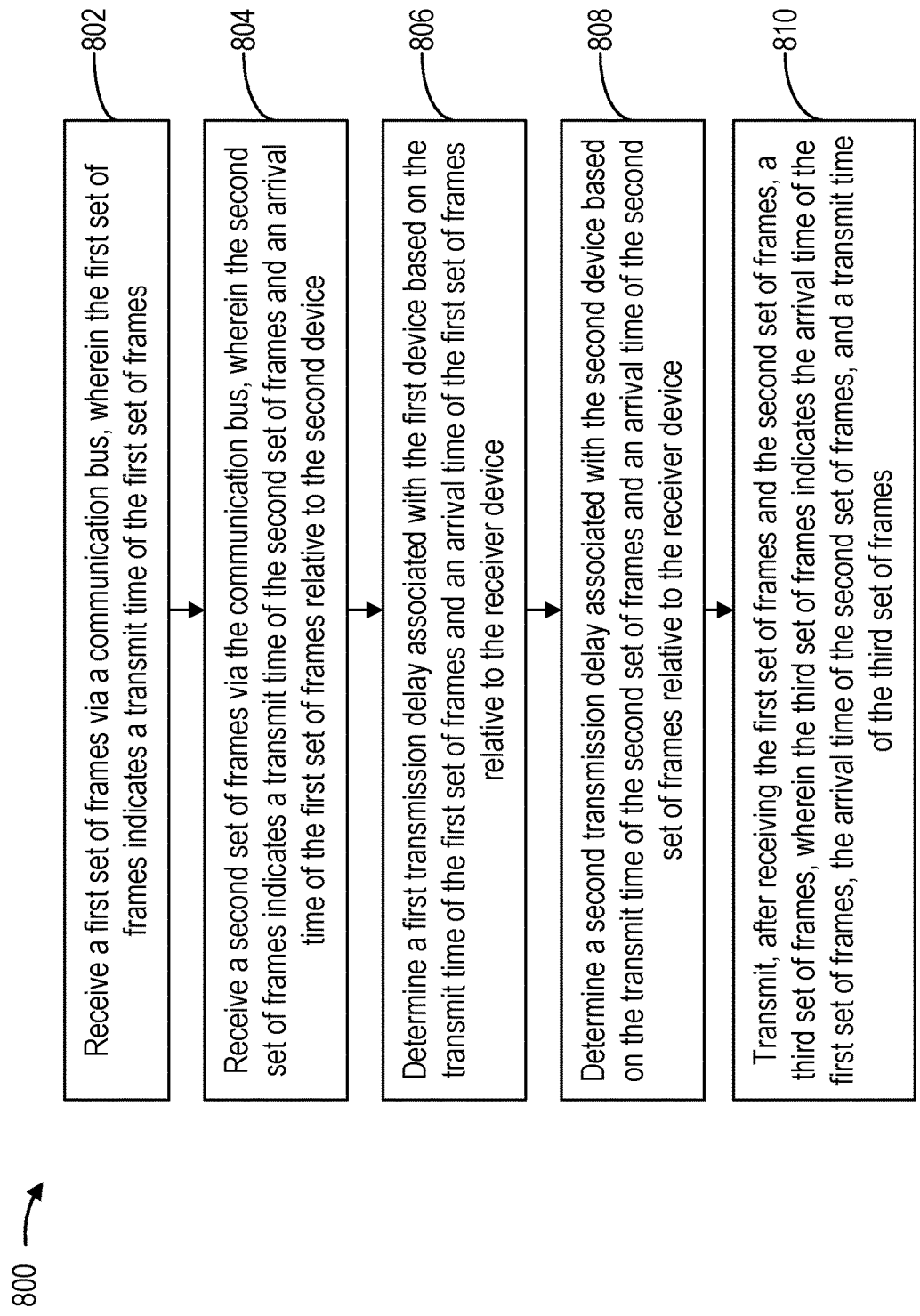
FIG. 8 is a flow chart of an example process for receiving synchronization messages via a communication bus.

FIG. 8 is a flow chart of an example process 800 for receiving synchronization messages via a communication bus. In some implementations, one or more process blocks of FIG. 8 may be performed by a node (e.g., node 602, a receiver device, and/or the like) of a communication bus (e.g., a CAN bus). In some implementations, one or more process blocks of FIG. 8 may be performed by a single node, a set of nodes, or a subset of nodes of the communication bus.

As shown in FIG. 8, process 800 may include receiving a first set of frames via a communication bus, wherein the first set of frames indicates a transmit time of the first set of frames (block 802). For example, the node (e.g., using processor 604, transceiver 606, and/or the like) may receive a first set of frames via a communication bus, as described above. In some implementations, the first set of frames may indicate a transmit time of the first set of frames.

As further shown in FIG. 8, process 800 may include receiving a second set of frames via the communication bus, wherein the second set of frames indicates a transmit time of the second set of frames and an arrival time of the first set of frames relative to the second device (block 804). For example, the node (e.g., using processor 604, transceiver 606, and/or the like) may receive a second set of frames via the communication bus, as described above. In some implementations, the second set of frames may indicate a transmit time of the second set of frames and an arrival time of the first set of frames relative to the second device.

As further shown in FIG. 8, process 800 may include determining a first transmission delay associated with the first device based on the transmit time of the first set of frames and an arrival time of the first set of frames relative to the receiver device (block 806). For example, the node (e.g., using processor 604, transceiver 606, and/or the like) may determine a first transmission delay associated with the first device based on the transmit time of the first set of frames and an arrival time of the first set of frames relative to the receiver device, as described above.

As further shown in FIG. 8, process 800 may include determining a second transmission delay associated with the second device based on the transmit time of the second set of frames and an arrival time of the second set of frames relative to the receiver device (block 808). For example, the node (e.g., using processor 604, transceiver 606, and/or the like) may determine a second transmission delay associated with the second device based on the transmit time of the second set of frames and an arrival time of the second set of frames relative to the receiver device, as described above.

As further shown in FIG. 8, process 800 may include transmitting, after receiving the first set of frames and the second set of frames, a third set of frames, wherein the third set of frames indicates the arrival time of the first set of frames, the arrival time of the second set of frames, and a transmit time of the third set of frames (block 810). For example, the node (e.g., using processor 604, transceiver 606, and/or the like) may transmit, after receiving the first set of frames and the second set of frames, a third set of frames, as described above. In some implementations, the third set of frames may indicate the arrival time of the first set of frames, the arrival time of the second set of frames, and a transmit time of the third set of frames.

Process 800 may include additional implementations, such as any single implementation or any combination of implementations described below and/or in connection with one or more other processes described elsewhere herein.

In a first implementation, the third set of frames may include a single frame. In some implementations, the single frame may indicate the arrival time of the first set of frames, the arrival time of the second set of frames, and the transmit time of the third set of frames.

In a second implementation, the third set of frames may include a first frame and a second frame. In some implementations, the first frame may indicate the arrival time of the first set of frames and the arrival time of the second set of frames. In some implementations, the second frame may be transmitted after the first frame and indicate the transmit time of the first frame.

In a third implementation, alone or in combination with one or more of the first and second implementations, process 800 may further include determining a measure of priority of one of the first device or the second device over a remaining one of the first device or the second device according to a clock synchronization schedule, and determining one of the first transmission delay or the second transmission delay before a remaining one of the first transmission delay or the second transmission delay based on the measure of priority.

In a fourth implementation, alone or in combination with one or more of the first through third implementations, process 800 may further include causing clock synchronization between the receiver device and the first device to be performed based on the first transmission delay, and causing clock synchronization between the receiver device and the second device to be performed based on the second transmission delay.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A receiver device, comprising:
   a receiver; and
   one or more processors configured to:
   receive, from a first device, a first set of frames via a communication bus,
      wherein the first set of frames indicates a transmit time of the first set of frames;
   receive, from a second device, a second set of frames via the communication bus,
      wherein the second set of frames indicates a transmit time of the second set of frames and an arrival time of the first set of frames relative to the second device;
   determine a first transmission delay associated with the first device based on the transmit time of the first set of frames and an arrival time of the first set of frames relative to the receiver device;
   determine a second transmission delay associated with the second device based on the transmit time of the second set of frames and an arrival time of the second set of frames relative to the receiver device; and
   transmit, after receiving the first set of frames and the second set of frames, a third set of frames,
      wherein the third set of frames indicates the arrival time of the first set of frames, the arrival time of the second set of frames, and a transmit time of the third set of frames, and
      wherein the first set of frames, the second set of frames, and the third set of frames are different from each other.

2. The receiver device of claim 1, wherein the third set of frames includes a single frame; and
   wherein the single frame indicates the arrival time of the first set of frames, the arrival time of the second set of frames, and the transmit time of the third set of frames.

3. The receiver device of claim 1, wherein the third set of frames includes a first frame and a second frame;
   wherein the first frame indicates the arrival time of the first set of frames and the arrival time of the second set of frames; and
   wherein the second frame is to be transmitted after the first frame and indicates the transmit time of the first frame.

4. The receiver device of claim 1, wherein the one or more processors are further configured to:
   determine a measure of priority of one of the first device or the second device over a remaining one of the first device or the second device according to a clock synchronization schedule; and
   determine one of the first transmission delay or the second transmission delay before a remaining one of the first transmission delay or the second transmission delay based on the measure of priority.

5. The receiver device of claim 1, wherein the one or more processors are further configured to:
   cause clock synchronization between the receiver device and the first device to be performed based on the first transmission delay; and
   cause clock synchronization between the receiver device and the second device to be performed based on the second transmission delay.

6. A method, comprising:
   receiving, by a first device, a first set of frames from a second device via a controller area network (CAN) bus,
      wherein the first set of frames indicates a transmit time of the first set of frames;
   receiving, by the first device and after receiving the first set of frames, a second set of frames from a third device via the CAN bus,
      wherein the second set of frames indicates a transmit time of the second set of frames and an arrival time of the first set of frames relative to the third device;
   determining, by the first device, a first transmission delay associated with the second device based on the transmit time of the first set of frames and an arrival time of the first set of frames relative to the first device;
   determining, by the first device, a second transmission delay associated with the third device based on the transmit time of the second set of frames and an arrival time of the second set of frames relative to the first device; and
   transmitting, by the first device and after receiving the first set of frames and the second set of frames, a third set of frames,
      wherein the third set of frames indicates the arrival time of the first set of frames, the arrival time of the second set of frames, and a transmit time of the third set of frames and
      wherein the first set of frames, the second set of frames, and the third set of frames are different from each other.

7. The method of claim 6, wherein the first set of frames includes a single frame; and
   wherein the second set of frames includes a single frame.

8. The method of claim 6, wherein the first set of frames includes a first frame and a second frame; and
   wherein the second frame is to be received after the first frame and indicates the transmit time of the first frame.

9. The method of claim 6, wherein the second set of frames includes a first frame and a second frame;
   wherein the first frame indicates the arrival time of the first set of frames relative to the third device; and
   wherein the second frame is to be received after the first frame and indicates the transmit time of the first frame.

10. The method of claim 6, further comprising:
    determining a measure of priority of one of the second device or the third device over a remaining one of the second device or the third device according to a clock synchronization schedule; and
    determining one of the first transmission delay or the second transmission delay before a remaining one of the first transmission delay or the second transmission delay based on the measure of priority.

11. The method of claim 6, further comprising:
   causing clock synchronization between the first device and the second device to be performed based on the first transmission delay; and
   causing clock synchronization between the first device and the third device to be performed based on the second transmission delay.

12. A sender device, comprising:
   a transmitter; and
   one or more processors configured to:
      transmit a first set of frames via a communication bus, wherein the first set of frames indicates a transmit time of the first set of frames;
      receive, from a first device and after transmitting the first set of frames, a second set of frames,
         wherein the second set of frames indicates an arrival time of the first set of frames relative to the first device, an arrival time of a third set of frames relative to the first device, and a transmit time of the second set of frames;
      identify the arrival time of the first set of frames and the transmit time of the second set of frames based on the second set of frames; and
      determine a transmission delay associated with the first device based on the arrival time of the first set of frames and the transmit time of the second set of frames,
         wherein the first set of frames, the second set of frames, and the third set of frames are different from each other.

13. The sender device of claim 12, wherein the first set of frames includes a single frame; and
   wherein the single frame indicates the transmit time of the single frame.

14. The sender device of claim 12, wherein the first set of frames includes a first frame and a second frame; and
   wherein the second frame is to be transmitted after the first frame and indicates the transmit time of the first frame.

15. The sender device of claim 12, wherein the second set of frames includes a single frame; and
   wherein the single frame indicates the arrival time of the first set of frames, the arrival time of the third set of frames, and the transmit time of the single frame.

16. The sender device of claim 12, wherein the second set of frames includes a first frame and a second frame;
   wherein the first frame indicates the arrival time of the first set of frames and the arrival time of the third set of frames; and
   wherein the second frame is to be received after the first frame and indicates the transmit time of the first frame.

17. The sender device of claim 12, wherein the arrival time of the first set of frames and the transmit time of the second set of frames are identified based on one or more of an identifier field or a payload field of a frame of the second set of frames.

18. The sender device of claim 12, wherein the one or more processors are further configured to:
   receive, from a second device and after transmitting the first set of frames, the third set of frames,
      wherein the third set of frames indicates an arrival time of the first set of frames relative to the second device and a transmit time of the third set of frames;
   identify the arrival time of the first set of frames and the transmit time of the third set of frames based on the third set of frames; and
   determine a transmission delay associated with the second device based on the arrival time of the first set of frames and the transmit time of the third set of frames.

19. The sender device of claim 12, wherein the one or more processors are further configured to:
   determine a measure of priority of one of the first device or a second device over a remaining one of the first device or the second device according to a clock synchronization schedule; and
   determine one of the transmission delay associated with the first device or a transmission delay associated with the second device before a remaining one of the transmission delay associated with the first device or the transmission delay associated with the second device based on the measure of priority.

20. The sender device of claim 12, wherein the one or more processors are further configured to:
   cause clock synchronization between the sender device and the first device to be performed based on the transmission delay.

* * * * *